(12) United States Patent
Toda et al.

(10) Patent No.: US 8,467,484 B2
(45) Date of Patent: Jun. 18, 2013

(54) RECEPTION CONTROL METHOD AND WIRELESS COMMUNICATION APPARATUS

(75) Inventors: Takeshi Toda, Yokohama (JP); Kenta Okino, Yokohama (JP); Taku Nakayama, Yokohama (JP); Tadashi Yamazaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 634 days.

(21) Appl. No.: 12/597,462

(22) PCT Filed: Apr. 24, 2008

(86) PCT No.: PCT/JP2008/057935
§ 371 (c)(1),
(2), (4) Date: Mar. 31, 2010

(87) PCT Pub. No.: WO2008/133298
PCT Pub. Date: Nov. 6, 2008

(65) Prior Publication Data
US 2010/0183099 A1 Jul. 22, 2010

(30) Foreign Application Priority Data
Apr. 24, 2007 (JP) .................................. 2007-114737

(51) Int. Cl.
*H04B 7/10* (2006.01)
(52) U.S. Cl.
USPC ............ 375/347; 375/267; 455/132; 455/296
(58) Field of Classification Search
USPC ........................... 375/347, 267; 455/132, 296
See application file for complete search history.

(56) References Cited

U.S. PATENT DOCUMENTS

| | | | | |
|---|---|---|---|---|
| 7,636,593 | B2 * | 12/2009 | Kurioka | 455/575.7 |
| 7,684,313 | B2 * | 3/2010 | Gold-Gavriely et al. | 370/210 |
| 7,822,133 | B2 * | 10/2010 | Nakamura | 375/260 |
| 2002/0177963 | A1 * | 11/2002 | Hirabe | 702/66 |
| 2003/0053412 | A1 * | 3/2003 | Yoshida et al. | 370/208 |
| 2003/0218569 | A1 * | 11/2003 | Akazawa et al. | 342/430 |
| 2005/0245224 | A1 | 11/2005 | Kurioka | 455/272 |
| 2007/0086329 | A1 * | 4/2007 | Glazko et al. | 370/208 |

FOREIGN PATENT DOCUMENTS

| | | |
|---|---|---|
| EP | 1018828 A2 * | 7/2000 |
| EP | 1148684 A2 * | 10/2001 |
| JP | 2001-308762 | 11/2001 |
| JP | 2003-087213 | 3/2003 |
| JP | 2003-229832 | 8/2003 |
| JP | 2003-229833 | 8/2003 |

(Continued)

OTHER PUBLICATIONS

Japanese language office action dated Jan. 31, 2012 and its English language translation issued in corresponding Japanese application 2007114737.

*Primary Examiner* — Juan A Torres
(74) *Attorney, Agent, or Firm* — DLA Piper LLP (US)

(57) ABSTRACT

When receiving a signal from the antenna #1 (initially receiving a signal from an omnidirectional antenna), a guard interval correlator 12 calculates correlation of a guard interval portion of the received signal and an output measuring unit 13 measures a peak output of the guard interval correlator 12. A comparator 14 compares the peak output measured by the output measuring unit 13 with a preset threshold, and when the peak output falls below the preset threshold and outputs an antenna switching control signal to an antenna switch 11, and the antenna switch 11 switches to the antenna #2 having a different directivity.

7 Claims, 24 Drawing Sheets

FOREIGN PATENT DOCUMENTS

| | | |
|---|---|---|
| JP | 2005-236678 | 9/2005 |
| JP | 2005-268924 | 9/2005 |
| JP | 2005-348278 | 12/2005 |
| JP | 2006-033056 | 2/2006 |
| JP | 2006-311009 | 11/2006 |
| JP | 2007-006295 | 1/2007 |
| JP | 2007-143090 | 6/2007 |
| JP | 2007-235305 | 9/2007 |

* cited by examiner

RECEPTION CONTROL METHOD AND WIRELESS COMMUNICATION APPARATUS

CROSS REFERENCE TO RELATED APPLICATION

This application is a national stage of international application No. PCT/JP2008/057935 filed Apr. 24, 2008, the entire contents of which are incorporated herein by reference. This application also claims priority to and the benefit of Japanese Patent Application No. 2007-114737 (filed on Apr. 24, 2007), the entire contents of which are incorporated herein by reference.

TECHNICAL FIELD

The present invention relates to a reception control method of a wireless communication apparatus for receiving OFDM signals.

BACKGROUND ART

In recent years, the Orthogonal Frequency Division Multiplexing (OFDM) scheme has been adopted as a transmission technique for broadband wireless communication typified by the IEEE802.11a standard and the IEEE802.16e standard. The OFDM transmission scheme is a technique for multiplexing and transmitting a digital modulation signal onto a number of carriers with orthogonal frequencies.

In the OFDM transmission scheme, the orthogonality of carriers should be secured to some extent, and if orthogonality between carriers is lost due to multipath fading of a propagation path and frequency shift of a received signal (hereinafter referred to as Doppler shift) due to Doppler effect associated with the movement of a transceiver and change in a propagation environment, the reception performance deteriorates.

For interference between symbols due to multipath delay, a certain level of countermeasures have been taken by adding a guard interval of sufficient length to the delay spread to each symbol of OFDM signal. In addition, as a countermeasure against the influence by frequency selective fading caused by the multipath delay, practical use of countermeasure techniques such as interleaving and error correction is progressing. As a countermeasure against the deteriorated reception performance due to lost orthogonality of OFDM signal carriers associated with the Doppler shift, since a complicated signal processing is generally required for compensation after reception, methods for improving the reception performance by performing diversity reception in a spatial area by reception from a plurality of antennas are disclosed in Patent Documents 1 and 2 shown below.

Patent Document 1 discloses a reception apparatus that is provided with an antenna having directivity in a moving direction and an antenna having directivity in a reverse direction, separates a signal arriving from the moving direction and a signal arriving from the reverse direction, and synthesizes them after compensating the Doppler shift respectively. Patent Document 1 discloses that the Doppler shift is estimated by an automotive sensor in the case of automobiles and is used for compensation. Patent Document 1 insists that the reception performance can be improved by separating and synthesizing OFDM signals having different Doppler shifts.

Patent Document 2 discloses a receiver in which each of a plurality of antennas is provided with an attenuator and each attenuator is adjusted to obtain a higher guard interval correlation output level in a period corresponding to the guard interval after demodulation, and as the guard interval, an FFT window is used as a control signal. Further, Patent Document 2 discloses a method for performing an AFC control along with control of attenuator to avoid adverse effect to the automatic frequency control (AFC) function due to the control of attenuator. Patent Document 2 insists that a stable diversity control can be performed in a condition where the reception signal quality is low.

Patent Document 1: Japanese Patent Application Laid-Open No. 2005-236678
Patent Document 2: Japanese Patent Application Laid-Open No. 2003-229832

SUMMARY OF INVENTION

Technical Problems

In the OFDM based cellular system typified by the 3GPPLTE, the 3GPP2 DO Rev.C or the IEEE802.16e, when the neighboring cells are operated on the same frequency band, a mobile wireless station performs multiple reception of OFDM signals on the same frequency band from a plurality of base stations around the mobile wireless station.

At this time, since the plurality of base stations around are placed respectively at difference places relative to the moving direction of the mobile wireless station, OFDM signals received from each base station have different Doppler shifts respectively (the signals fluctuate on a frequency axis in different directions, at different speeds and by different amounts). Therefore, the orthogonality of carrier frequencies of received OFDM signals may be lost and the reception performance may deteriorate even in the environment where no multipath arrives from 360-degree around.

In a serious state, when a mobile wireless station performs initial connection or handover in an area where coverages of neighboring cells overlap such as cell edge or the like, and if the OFDM signals from base stations are received at almost the same level, the peak of guard interval correlation output deteriorates, and the mobile wireless station cannot generate a frame/symbol timing clock and perform synchronization of frequency. Thus, the mobile wireless station gets lost.

In addition, when the conventional arts of reception with multiple antennas (Patent Documents 1 and 2) are applied to solve the problems, the following problems occur. The invention disclosed in Patent Document 1 is under the assumption of automotive receiver. Therefore it is assumed that the moving direction and the moving speed are recognized. However, it is difficult to recognize them when the mobile wireless station is a mobile terminal. Moreover, even if there is no information on the moving direction and the moving speed, with respect to the method in which a directional antenna is switched to separate and synthesize the multipath and their Doppler, processing delay and overhead of hardware occur.

On the other hand, according to the invention disclosed in Patent Document 2, an antenna is controlled depending on the period corresponding to the guard interval. However, the present invention is to solve the situation where the timing of guard interval, that is, symbol timing clock, cannot be generated. Thus the technique disclosed in Patent Document 2 cannot directly be applied.

The present invention is designed in view of the above-described problem, and it is an object of the present invention to provide a reception control method of a wireless communication apparatus capable of appropriately processing a received signal even when a wireless communication apparatus moving at a high speed performs initial connection or handover in the environment where cells overlap or the like.

Solutions to Problems

In order to achieve the above-described object, a reception control method for a wireless communication apparatus having a plurality of antennas in accordance with the present invention includes a recognition step of recognizing a peak output of a guide interval correlator and/or recognizing a number of samples exceeding a predetermined power value in a predetermined period from output of the guard interval correlator with respect to a received signal and an antenna directivity control step of changing directivity of an antenna in the plurality of antennas when the recognized peak output falls below a first predetermined value and/or the number of samples exceeds a second predetermined value.

It is preferable that the plurality of antennas include a first antenna and a second antenna that have different directivities from each other and at the antenna directivity control step, the directivity of the antenna in the plurality of antennas is changed by switching from the first antenna to the second antenna when the peak output falls below the first predetermined value and/or the number of samples exceeds the second predetermined value. In addition, it is preferable that the plurality of antennas are directional antennas or include a directional antenna, and at the antenna directivity control step, the directivity of the antenna in the plurality of antennas is changed by controlling a weighing factor used for weighting a signal received by the directional antenna when the peak output falls below the first predetermined value and/or the number of samples exceeds the second predetermined value.

In addition, at the antenna directivity control step, it is preferable that the directivity of the antenna in the plurality of antennas is changed by controlling the weighting factor used for weighting the signal received by the directional antenna to make a half-value angle of directivity of the directional antenna relatively narrow when the peak output falls below the first predetermined value and/or the number of samples exceeds the second predetermined value.

Further, in a reception control method for a wireless communication apparatus having a plurality of antennas in accordance with the present invention, the plurality of antennas are directional antennas or include a directional antenna and the reception control method includes: a first recognition step of recognizing a peak output of a guard interval correlator and/or a number of samples exceeding a predetermined power value in a predetermined period from output of the guard interval correlator with respect to a received signal; a first antenna directivity control step of changing directivity of the antenna by controlling a weighting factor used for weighting a signal received by the directional antenna when the peak output recognized at the first recognition step falls below a first predetermined value and/or the number of samples exceeds a second predetermined value; a second recognition step of recognizing a peak output of the guard interval correlator and/or a number of samples exceeding a predetermined power value in a predetermined period from output of the guard interval correlator with respect to a received signal after the first antenna directivity control step; and a second antenna directivity control step of changing the directivity of the antenna in the plurality of antennas by controlling the weighting factor to make the peak value exceed the first predetermined value when the peak output recognized by the second recognition step falls below a predetermined value and/or by controlling the weighting factor to make the number of samples fall below the second predetermined value when the number of samples exceeds the second predetermined value.

In addition, the present invention further includes a received power measurement step of measuring received power, and at the antenna directivity control step, the directivity of the antenna in the plurality of antennas is changed when the peak output falls below the first predetermined value and/or the number of samples exceeds the second predetermined value and the received power measured at the received power measurement step exceeds a third predetermined value.

Moreover, the present invention further includes a received power measurement step for each antenna of measuring received power of each of the plurality of antennas, and at the antenna directivity control step, the directivity of the antenna in the plurality of antennas is changed by switching from the first antenna to the second antenna that has relatively high received power based on the measured received power of each antenna when the peak output falls below the first predetermined value and/or the number of samples exceeds the second predetermined value.

It is preferable that at the recognition step, the peak output of the guard interval correlator is recognized and/or the number of samples exceeding the predetermined power value in the predetermined period is recognized from the output of the guard interval correlator with respect to a received signal of at least the first antenna, and at the antenna directivity control step, the directivity of the antenna in the plurality of antennas is changed and a symbol timing of a frame of the received signal of the first antenna is changed to a symbol timing of a frame of the received signal of the second antenna by switching from the first antenna to the second antenna when the peak output falls below the first predetermined value and/or the number of samples exceeds the second predetermined value.

It is preferable that at the recognition step, peak outputs of the guard interval correlator are recognized and/or numbers of samples exceeding the predetermined power value in the predetermined period are recognized respectively from output of the guard interval correlator with respect to a received signal of the first antenna and a received signal of the second antenna, respectively, and at the antenna directivity control step, the directivity of the antenna in the plurality of antennas is changed by switching from the first antenna to the second antenna when the peak output with respect to the first antenna falls below a predetermined value and/or the number of samples exceeds the second predetermined value and the peak output with respect to the second antenna exceeds a predetermined value.

It is preferable that at the recognition step, peak outputs of the guard interval correlator are recognized and/or numbers of samples exceeding the predetermined power value in the predetermined period are recognized from outputs of the guard interval correlator with respect to a received signal of the first antenna and a received signal of the second antenna, respectively, and at the antenna directivity control step, the directivity of the antenna in the plurality of antennas is controlled and a symbol timing of a frame of the received signal of the first antenna is changed to a symbol timing of a frame of the received signal of the second antenna by adapting an antenna having a higher peak output as a result of comparison between the recognized peak outputs and/or by adapting an antenna having a smaller number of samples as a result of comparison between the recognized numbers of samples.

In addition, it is preferable that the recognition step and the antenna directivity control step are executed when the wireless communication apparatus is initially connected to a wireless communication apparatus of a corresponding party and/ or is connected from a wireless communication apparatus of a current corresponding party to a wireless communication apparatus of another corresponding party, and the execution is stopped when the wireless communication apparatus completes the initial connection to the wireless communication apparatus of the corresponding party and/or completes the change of connection from the wireless communication apparatus of the current corresponding party to the wireless communication apparatus of another corresponding party.

Further, it is preferable that the reception control method further includes a synchronization recognition step of recognizing whether or not synchronization is established with a base station on a corresponding party side which is a connection target in a predetermined period when the wireless communication apparatus is initially connected to a wireless communication apparatus of the corresponding party and/or is connected from a wireless communication apparatus of a current corresponding party to a wireless communication apparatus of another corresponding party, and when it is recognized that the wireless communication apparatus does not establish synchronization with the base station on the corresponding party side which is the connection target in the predetermined period as a result of recognition at the synchronization recognition step, the recognition step and the antenna directivity control step are executed, and when it is recognized that the wireless communication apparatus establishes synchronization with the base station on the corresponding party side which is the connection target in the predetermined period, the execution is stopped.

Moreover, it is preferable that the reception control method further includes a clock jitter amount detection step of measuring a clock jitter amount of a symbol timing of a frame of a received signal, and when the measured clock jitter amount exceeds a predetermined value, the recognition step and the antenna directivity control step are executed, and after the steps are executed, if the measured clock jitter amount falls below the predetermined value as a result of the clock jitter amount detection step, the execution is stopped.

In addition, it is preferable that the directivity of the antenna in the plurality of antennas is controlled to be omnidirectional when the execution is stopped, and the directivity of the antenna in the plurality of antennas is omnidirectional when the wireless communication apparatus starts initial connection to a wireless communication apparatus of a corresponding party and/or starts connection from a wireless communication apparatus of a current corresponding party to a wireless communication apparatus of another corresponding party, and the directivity of the antenna in the plurality of antennas after executing the recognition step and the antenna directivity control step is directional.

Further, a wireless communication apparatus having a plurality of antennas in accordance with the present invention includes: a guard interval correlator which inputs a signal received by the antenna; an output measurement unit for measuring output of the guard interval correlator; a comparison unit for comparing a value relating to the output measured by the output measurement unit and a predetermined value; and an antenna directivity control unit for controlling directivity of an antenna in the plurality of antennas based on a result of the comparison by the comparison unit.

The value relating to the output indicates a peak output of the guard interval correlator, and it is preferable that the comparison unit compares the peak output with the predetermined value and the antenna directivity control unit controls to change the antenna directivity when the peak output falls below the predetermined value. In addition, it is preferable that the predetermined value is a value based on a power value in a predetermined period. Further, the value relating to the output indicates the number of samples exceeding a predetermined power value in the predetermined period with respect to the output of the guard interval correlator, and it is preferable that the comparison unit compares the number of samples with the predetermined value and the antenna directivity control unit controls to change the antenna directivity when the number of samples exceeds the predetermined value.

Advantageous Effects on Invention

According to the present invention, even when a wireless communication apparatus moving at a high speed performs initial connection or handover in the environment where coverages of neighboring cells overlap such as cell edge or the like, a received signal can appropriately be processed. That is, even when the peak output of guard interval correlation drops and generation of a frame/symbol timing clock and synchronization of frequency cannot be performed, a signal having less Doppler shift can be received by a plurality of antenna switching diversity and array synthesis diversity. Thus the peak of guard interval correlation is raised and a frame/symbol timing clock can be regenerated.

DESCRIPTION OF THE PREFERRED EMBODIMENTS

Figure 1:
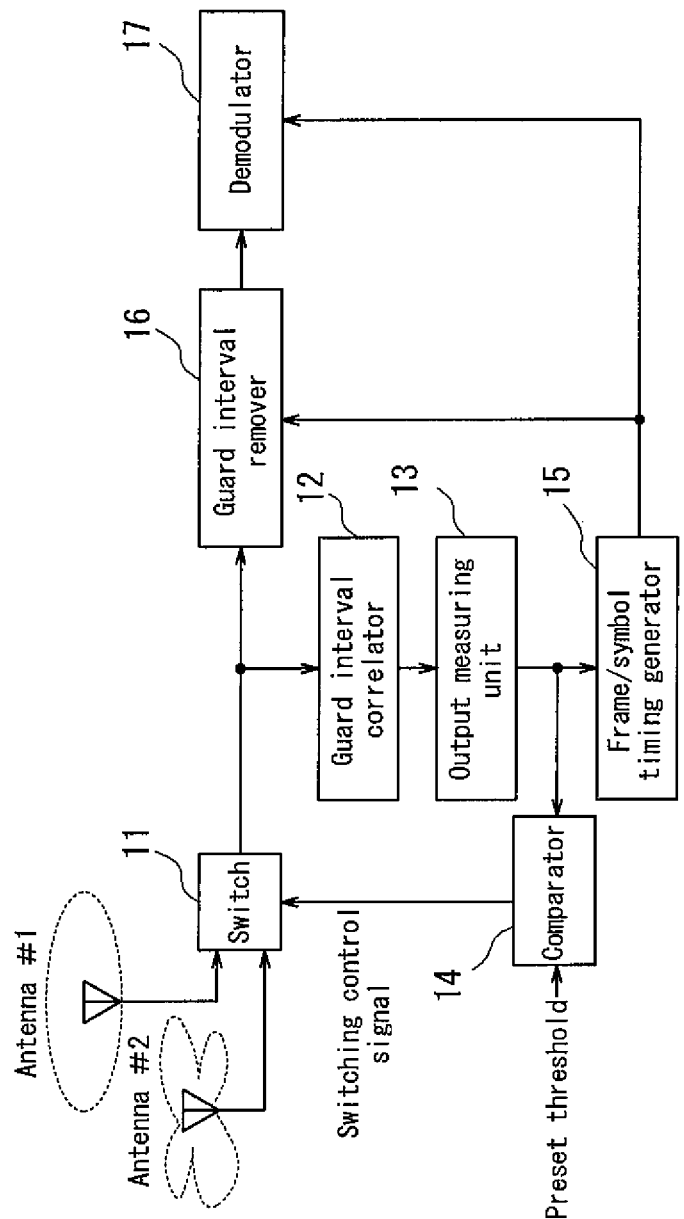
FIG. 1 is a functional block diagram showing a wireless communication apparatus in accordance with a first embodiment of the present invention.

Preferred embodiments of the present invention will now be described below with reference to the accompanying drawings. FIG. 1 is a functional block diagram showing an antenna and an antenna control unit of a wireless communication apparatus in accordance with a first embodiment of the present invention. The antenna and the antenna control unit shown in FIG. 1 include a plurality of antennas having different directivities from each other, an antenna switch 11 for switching the plurality of antennas, a guard interval correlator 12 for calculating correlation of a guard interval portion of a signal received by the antennas, an output measuring unit 13 for recognizing (measuring) the peak output of the guard interval correlator 12 and a comparator 14 for comparing the peak output recognized (measured) by the output measuring unit 13 and a preset threshold (a first predetermined value). It should be noted that FIG. 1 shows only antennas #1 and #2 to avoid the diagram being complicated. A frame/symbol timing generator 15 generates a symbol timing signal and a frame timing signal based on the peak output recognized (measured) by the output measuring unit 13. The guard interval remover 16 removes the guard interval from the received signal based on the frame/symbol timing signal and extracts an effective symbol, and a demodulator 17 performs Fourier transform based on the frame/symbol timing signal.

Figure 2:
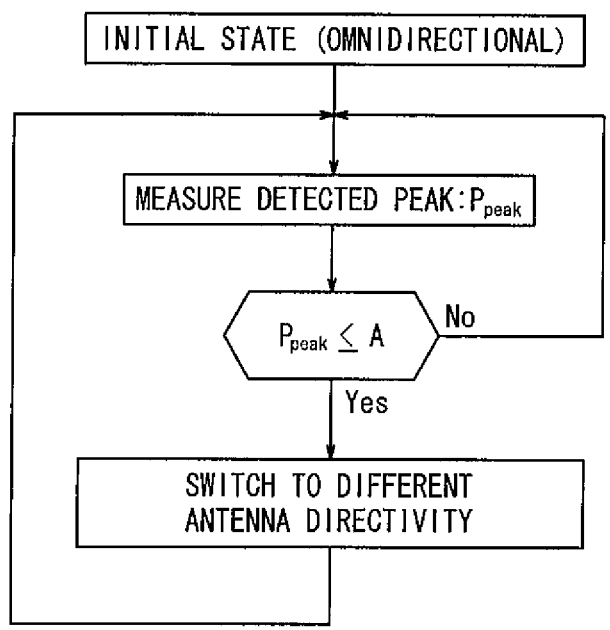
FIG. 2 is a flowchart illustrating an operation of the first embodiment.
Figure 3:
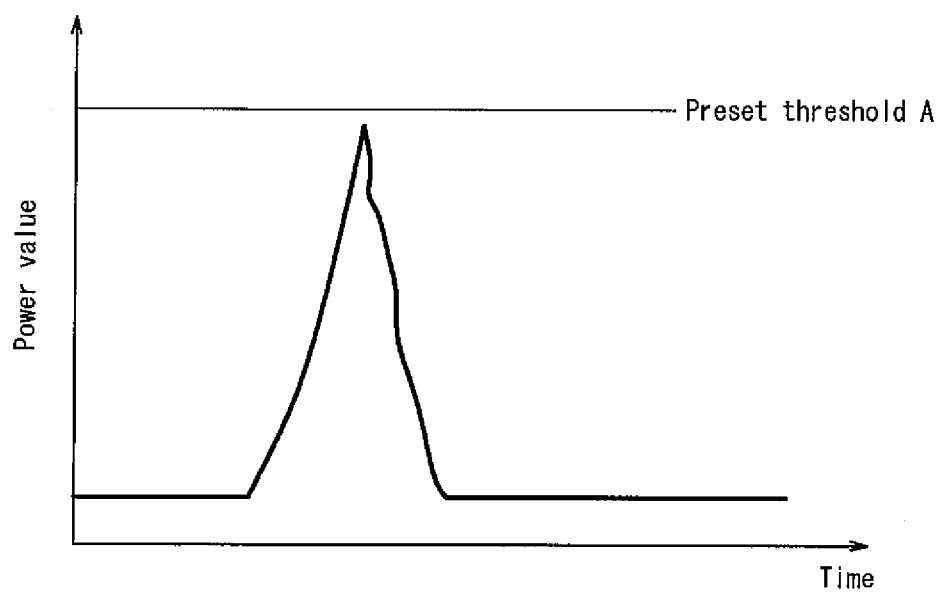
FIG. 3 is a graph showing an example of output distribution of a guard interval correlator.

FIG. 2 is a flowchart illustrating an operation of the first embodiment. When receiving a signal from the antenna #1 (initially receiving a signal from an omnidirectional antenna), the guard interval correlator 12 calculates the correlation of the guard interval portion of the received signal and the output measuring unit 13 measures the peak output Ppeak of the guard interval correlator 12. FIG. 3 is a graph showing an example of output distribution of the guard interval correlator 12 measured by the output measuring unit 13. The graph shows power value on the vertical axis and time on the horizontal axis. The comparator 14 compares the peak output Ppeak measured by the output measuring unit 13 with the preset threshold (the first predetermined value) A and when the Ppeak falls below the preset threshold (the first predetermined value) A, outputs an antenna switching control signal to the antenna switch 11. When receiving the antenna switching control signal, the antenna switch 11 switches to the antenna #2 having a different directivity. The wireless communication apparatus in accordance with the present invention changes the directivity of the antenna in the plurality of antennas by the above-described operation.

Figure 4:
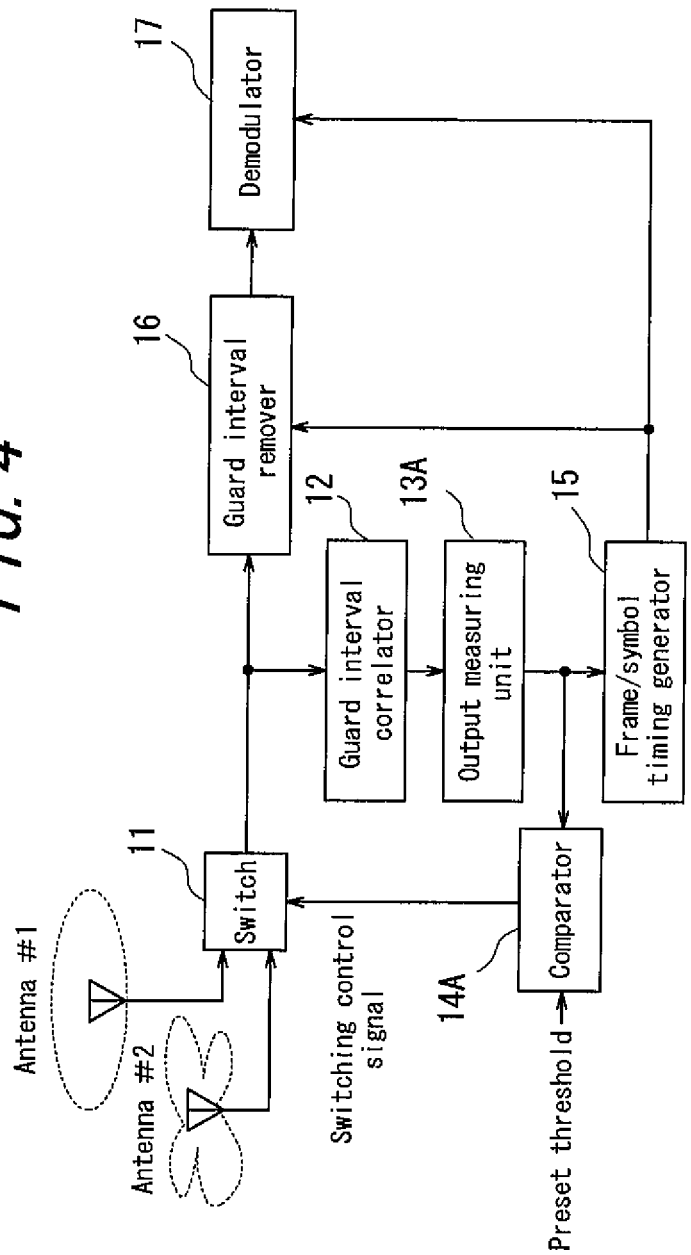
FIG. 4 is a functional block diagram showing a modified embodiment.

An antenna and an antenna control unit shown in FIG. 4 include an output measuring unit 13A and a comparator 14A instead of the output measuring unit 13 and the comparator 14 shown in FIG. 1. The output measuring unit 13A recognizes (measures) the number of samples exceeding a predetermined power value in a predetermined period based on the output from the guard interval correlator 12, and the comparator 14A compares the number of samples recognized (measured) by the output measuring unit 13A with a preset threshold (a second predetermined value). Other than the above are the same as the antenna and the antenna control unit shown in FIG. 1. The antenna and the antenna control unit in accordance with the first embodiment may include, as shown in FIG. 4, the output measuring unit 13A and the comparator 14A instead of the output measuring unit 13 and the comparator 14 shown in FIG. 1.

Figure 5:
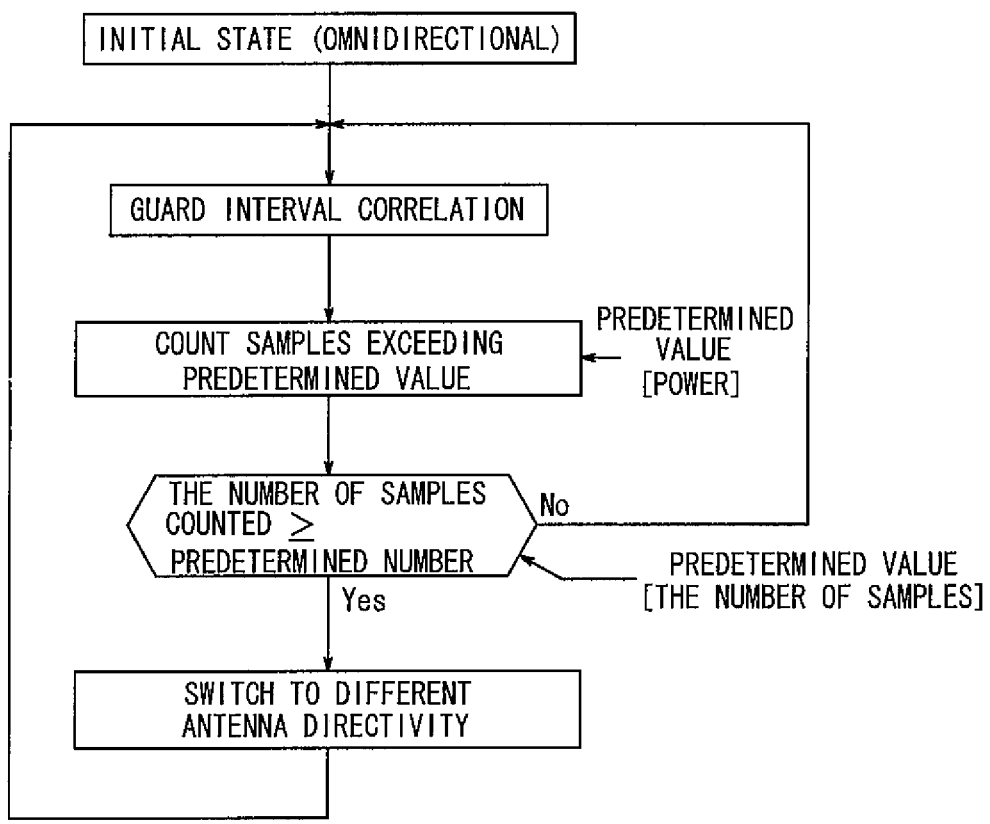
FIG. 5 is a flowchart illustrating an operation of the modified embodiment.
Figure 6:
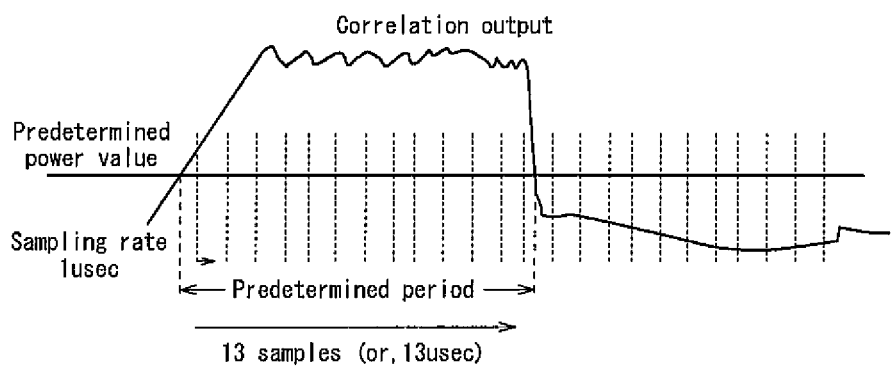
FIG. 6 is a diagram showing an example of output distribution of the guard interval correlator.
Figure 7:
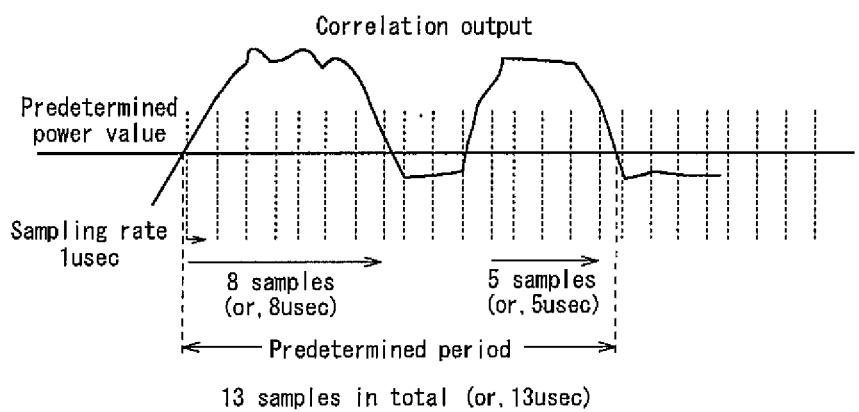
FIG. 7 is a diagram showing an example of output distribution of the guard interval correlator.

FIG. 5 is a flowchart illustrating an operation of the embodiment including the output measuring unit 13A and the comparator 14A. When receiving a signal from the antenna #1 (initially receiving a signal from an omnidirectional antenna), the guard interval correlator 12 calculates the correlation of the guard interval portion of the received signal, and the output measuring unit 13A counts the number of samples exceeding the predetermined power value in the predetermined period from the output of the guard interval correlator 12. FIGS. 6 and 7 are graphs showing an example of output distribution of the guard interval correlator 12 measured by the output measuring unit 13A. The graphs show power value on the vertical axis and time on the horizontal axis. Both FIGS. 6 and 7 show the case where the number of samples exceeding the predetermined power value in the predetermined period is 13. The comparator 14A compares the number of samples counted by the output measuring unit 13A with the preset threshold (the second predetermined value) and when the number of samples exceeds the preset threshold (the second predetermined value), outputs an antenna switching control signal to the antenna switch 11. When receiving the antenna switching control signal, the antenna switch 11 switches to the antenna #2 having a different directivity. The wireless communication apparatus in accordance with the present invention changes the directivity of the antenna in the plurality of antennas by the above-described operation.

Figure 8:
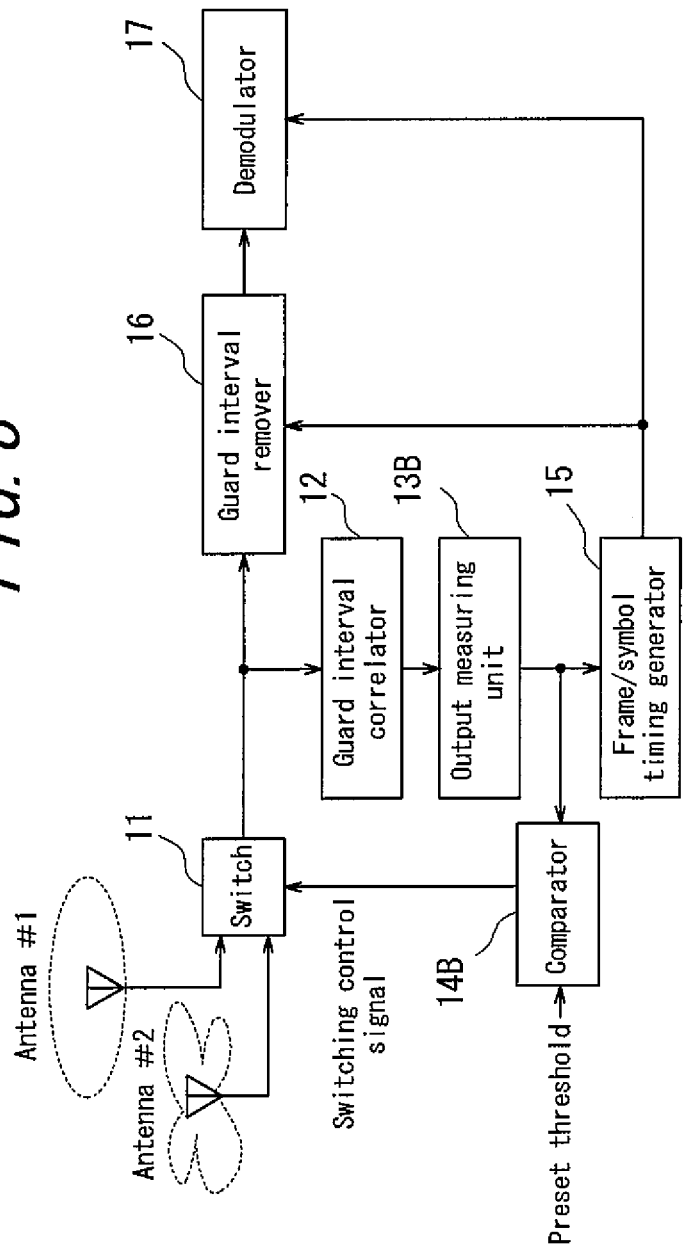
FIG. 8 is a functional block diagram showing a modified embodiment.

The antenna and the antenna control unit shown in FIG. 8 include an output measuring unit 13B and a comparator 14B instead of the output measuring unit 13 and the comparator 14 shown in FIG. 1. The output measuring unit 13B recognizes (measures) the peak output of the guard interval correlator 12 and recognizes (measures) the number of samples exceeding a predetermined power value in a predetermined period from the output of the guard interval correlator 12. The comparator 14B compares the peak output recognized (measured) by the output measuring unit 13B with a preset threshold (the first predetermined value) and compares the number of samples recognized (measured) by the output measuring unit 13B with a preset threshold (the second predetermined value) as well. Other than the above are the same as the antenna and the antenna control unit shown in FIG. 1. The antenna and the antenna control unit in accordance with the first embodiment may include, as shown in FIG. 8, the output measuring unit 13B and the comparator 14B instead of the output measuring unit 13 and the comparator 14 shown in FIG. 1.

Figure 9:
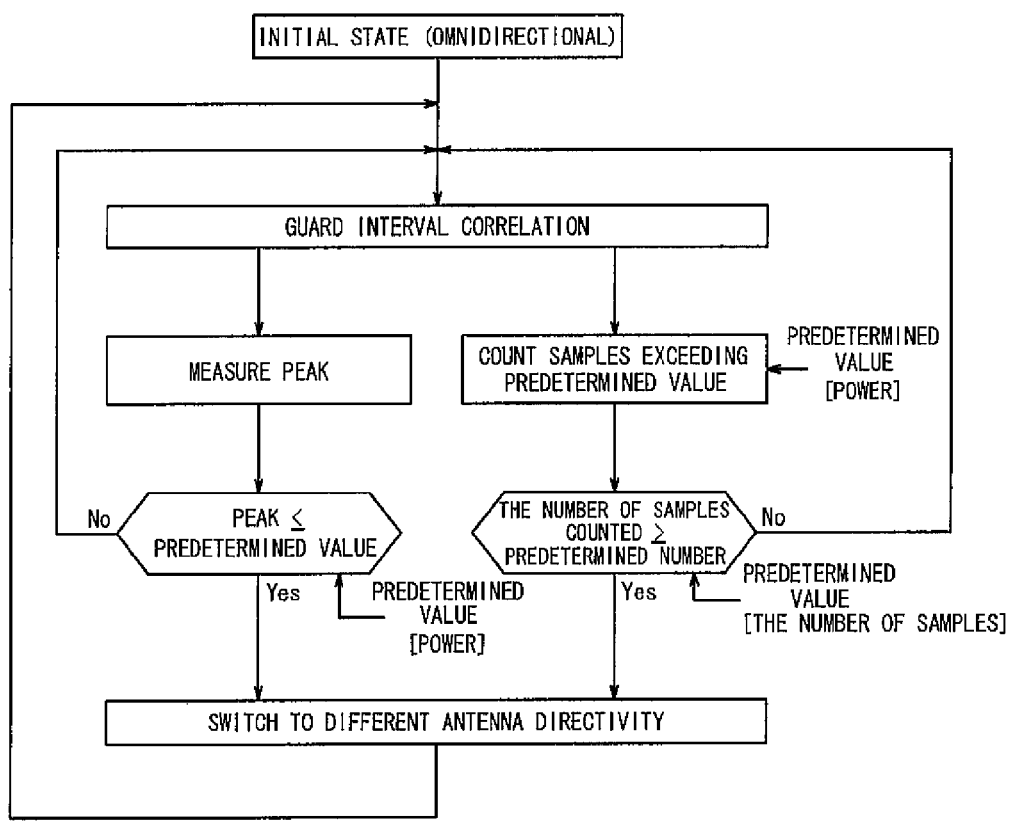
FIG. 9 is a flowchart illustrating an operation of the modified embodiment.

FIG. 9 is a flowchart illustrating an operation of the embodiment including the output measuring unit 13B and the comparator 14B. When receiving a signal from the antenna #1 (initially receiving a signal from an omnidirectional antenna), the guard interval correlator 12 calculates the correlation of the guard interval portion of the received signal, and the output measuring unit 13B measures the peak output Ppeak of the guard interval correlator 12 and counts the number of samples exceeding the predetermined power value in the predetermined period from the output of the guard interval correlator 12. The comparator 14B compares the peak output Ppeak measured by the output measuring unit 13 with the preset threshold (the first predetermined value) A and compares the number of samples counted by the output measuring unit 13B with the preset threshold (the second predetermined value) as well. The comparator 14B then outputs an antenna switching control signal to the antenna switch 11 when the peak output Ppeak falls below the preset threshold A and/or the number of samples exceeds the preset threshold. When receiving the antenna switching control signal, the antenna switch 11 switches to the antenna #2 having a different directivity. The wireless communication apparatus in accordance with the present invention changes the directivity of the antenna in the plurality of antennas by the above-described operation.

Figure 10:
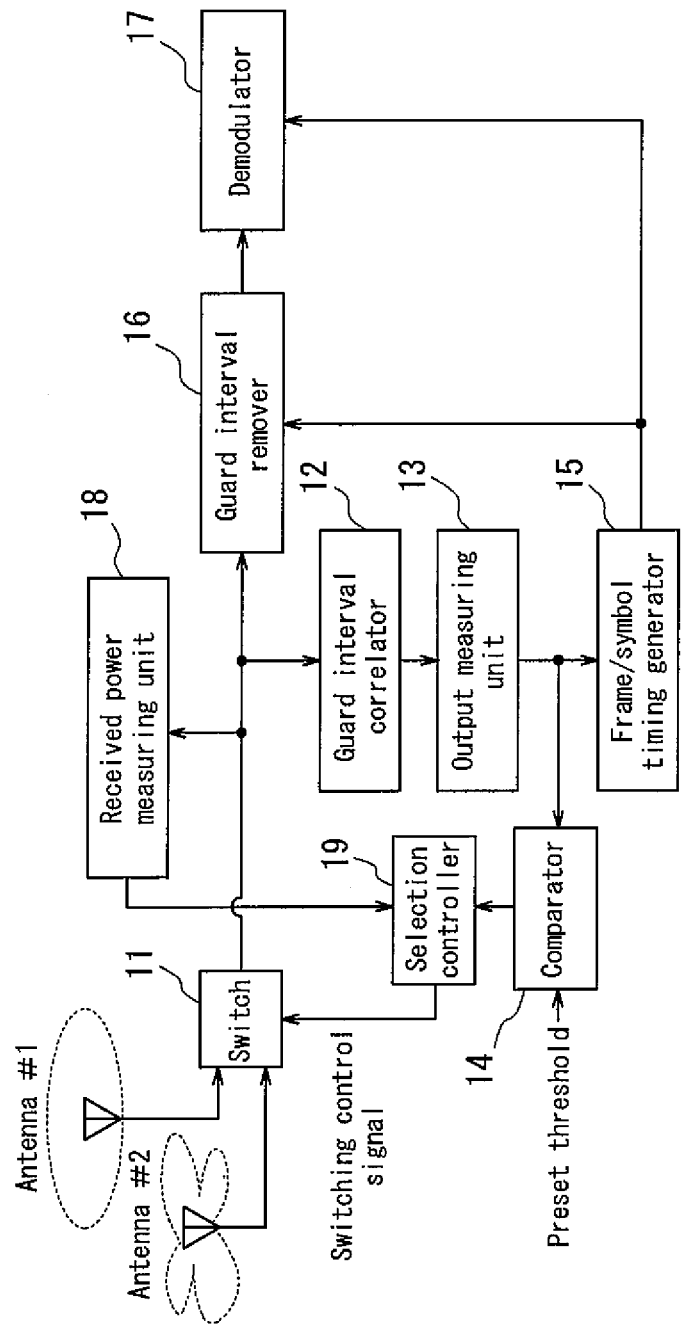
FIG. 10 is a functional block diagram showing a wireless communication apparatus in accordance with a second embodiment of the present invention.

FIG. 10 is a functional block diagram showing an antenna and an antenna control unit in accordance with a second embodiment. The antenna and the antenna control unit shown in FIG. 10 include a plurality of antennas having directivities different from each other, an antenna switch 11, a guard interval correlator 12, an output measuring unit 13, a comparator 14, a received power measuring unit 18 for measuring power of output signal of the antenna switch 11 and a selection controller 19 for receiving control signals from the comparator 14 and the received power measuring unit 18 and outputting an antenna switching control signal to the antenna switch 11. It should be noted that FIG. 10 shows only antennas #1 and #2 to avoid the diagram being complicated.

Figure 11:
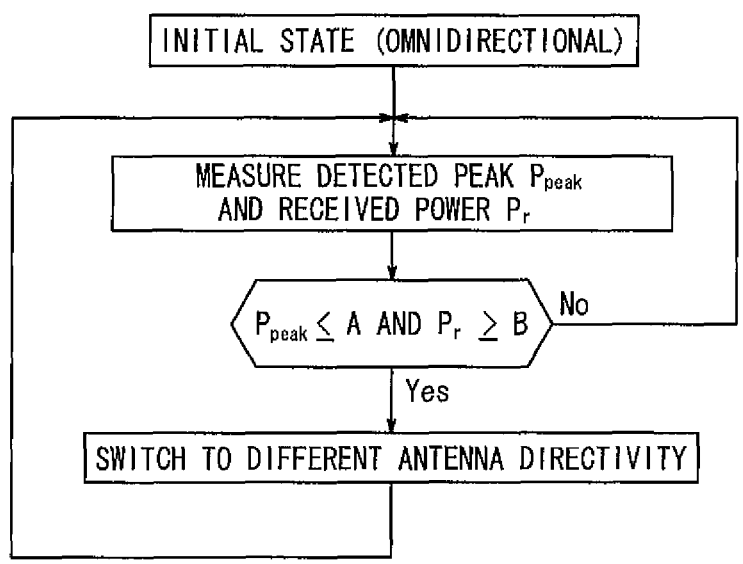
FIG. 11 is a flowchart illustrating an operation of the second embodiment.

FIG. 11 is a flowchart illustrating an operation of the second embodiment. When receiving a signal from the antenna #1 (initially receiving a signal from an omnidirectional antenna), the guard interval correlator 12 calculates the correlation of a guard interval portion of the received signal, and the output measuring unit 13 measures the peak output Ppeak of the guard interval correlator 12. The comparator 14 compares the peak output Ppeak measured by the output measuring unit 13 with the preset threshold (the first predetermined value) A, and when the Ppeak falls below the preset threshold (the first predetermined value) A, outputs a control signal to the selection controller 19. The received power measuring unit 18 outputs a control signal to the selection controller 19 when the received power Pr exceeds a preset threshold (a third predetermined value) B. When receiving the control signals from the comparator 14 and the received power measuring unit 18, respectively, the selection controller 19 outputs an antenna switching control signal to the antenna switch 11. When receiving the antenna switching control signal, the antenna switch 11 switches to the antenna #2 having a different directivity.

It should be noted that the antenna and the antenna control unit in accordance with the second embodiment may include the output measuring unit 13A and the comparator 14A shown in FIG. 4 instead of the output measuring unit 13 and the comparator 14 as in the case of the first embodiment, or may include the output measuring unit 13B and the comparator 14B shown in FIG. 8 instead of the output measuring unit 13 and the comparator 14.

Figure 12:
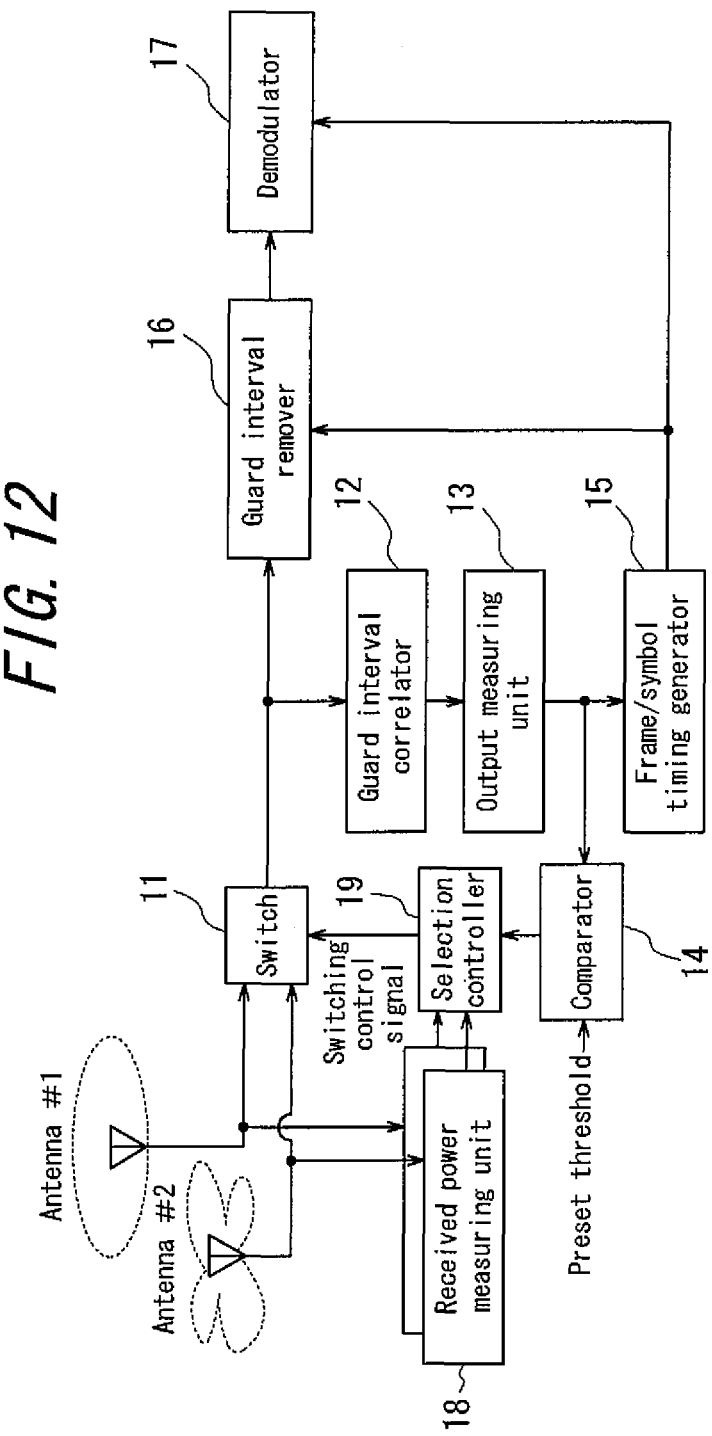
FIG. 12 is a functional block diagram showing a wireless communication apparatus in accordance with a third embodiment of the present invention.

FIG. 12 is a functional block diagram showing an antenna and an antenna control unit in accordance with a third embodiment. The antenna and the antenna control unit shown in FIG. 12 include a plurality of antennas having directivities different from each other, an antenna switch 11, a guard interval correlator 12, an output measuring unit 13, a comparator 14, received power measuring units 18 provided to the plurality of antennas, respectively, and for measuring the received power of the antennas, and a selection controller 19. It should be noted that FIG. 12 shows only antennas #1 and #2 to avoid the diagram being complicated.

Figure 13:
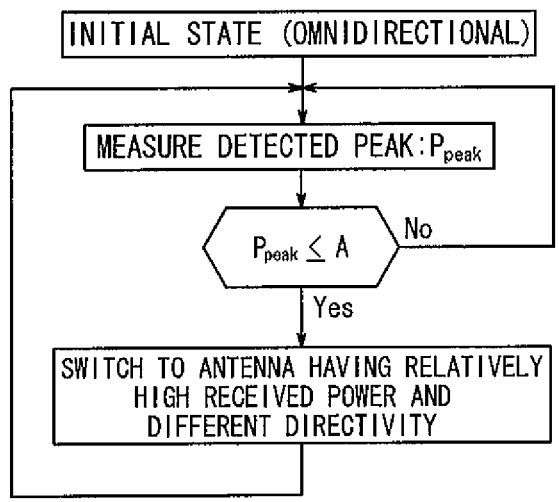
FIG. 13 is a flowchart illustrating an operation of the third embodiment.

FIG. 13 is a flowchart illustrating an operation of the third embodiment. When receiving a signal from the antenna #1 (initially receiving a signal from an omnidirectional antenna), the guard interval correlator 12 calculates the correlation of a guard interval portion of the received signal, and the output measuring unit 13 measures the peak output Ppeak of the guard interval correlator 12. The comparator 14 compares the peak output Ppeak measured by the output measuring unit 13 with the preset threshold (the first predetermined value) A, and when the Ppeak falls below the preset threshold (the first predetermined value) A, outputs a control signal to the selection controller 19. The received power measuring units 18 measure the received power of the plurality of antennas, respectively, and output measured values to the selection controller 19. When receiving the control signal from the comparator 14, the selection controller 19 outputs an antenna switching control signal for switching to an antenna whose received power is relatively high to the antenna switch 11. When receiving the antenna switching control signal, the antenna switch 11 switches to the antenna #2 having a relatively high received power and a different directivity.

Figure 14:
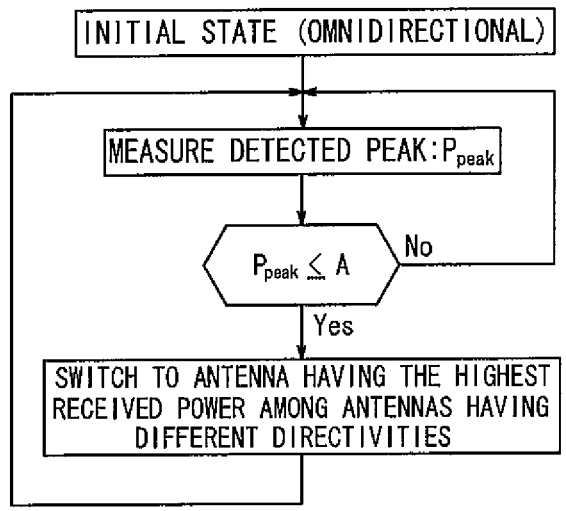
FIG. 14 is a flowchart illustrating an operation for switching to an antenna having the highest received power.

In addition, it should be noted that when receiving the control signal from the comparator 14, the selection controller 19 may output an antenna switching control signal for switching to an antenna having the highest received power to the antenna switch 11, and the antenna switch 11 receives the signal and may switch to the antenna #2 having the highest received power among the antennas having directivities different from each other. FIG. 14 is a flowchart illustrating an operation for switching to an antenna having the highest received power.

Moreover, it should be noted that the antenna and the antenna control unit in accordance with the third embodiment may include the output measuring unit 13A and the comparator 14A shown in FIG. 4 instead of the output measuring unit 13 and the comparator 14 as in the case of the first embodiment, or may include the output measuring unit 13B and the comparator 14B shown in FIG. 8 instead of the output measuring unit 13 and the comparator 14.

Figure 15:
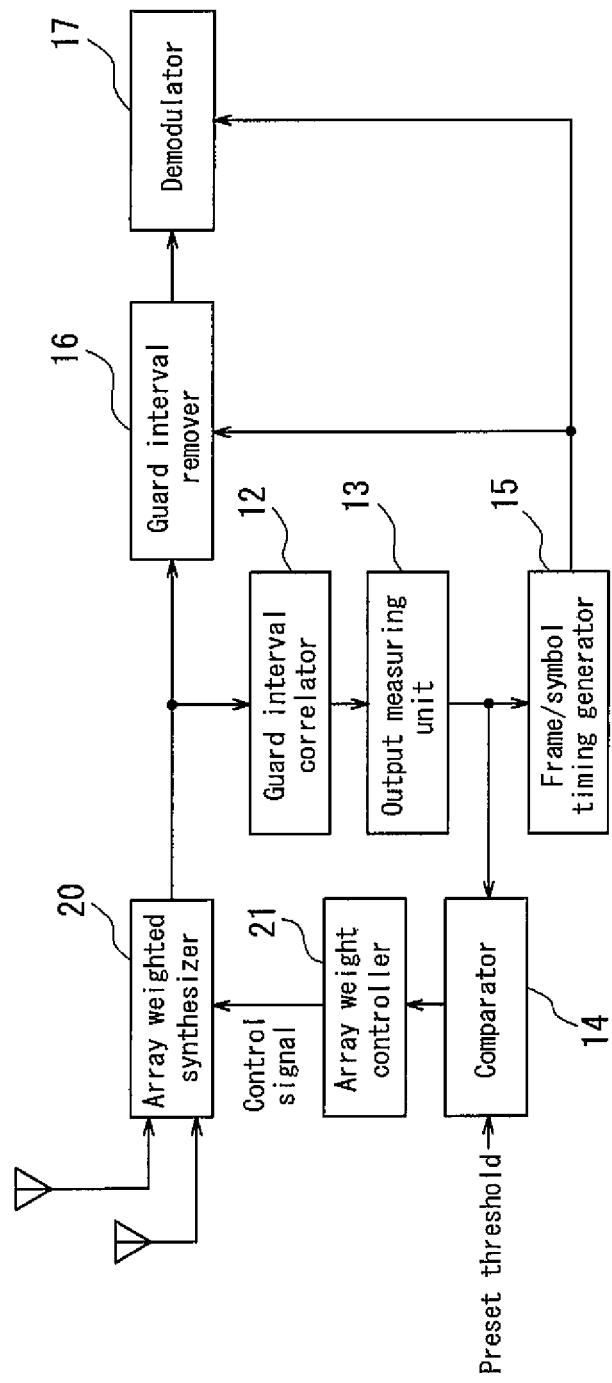
FIG. 15 is a functional block diagram showing a wireless communication apparatus in accordance with a fourth embodiment of the present invention.

FIG. 15 is a functional block diagram showing an antenna and an antenna control unit in accordance with a fourth embodiment. The antenna and the antenna control unit shown in FIG. 15 include a plurality of directional antennas (adaptive array antennas), an array weighted synthesizer 20 for weighted-synthesizing signals received from the plurality of directional antennas, a guard interval correlator 12, an output measuring unit 13, a comparator 14 and an array weight controller 21.

Figure 16:
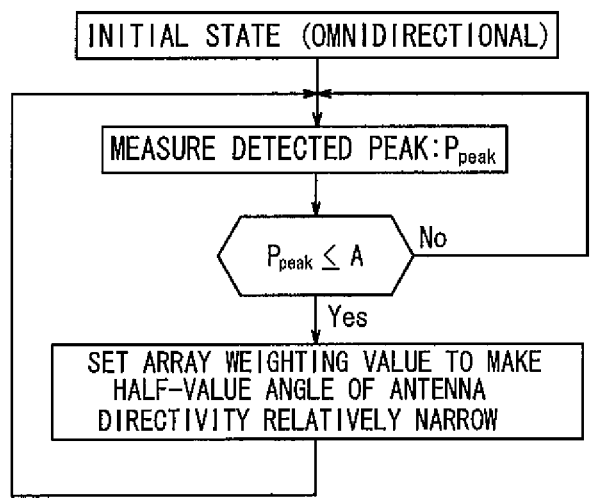
FIG. 16 is a flowchart illustrating an operation of the fourth embodiment.

FIG. 16 is a flowchart illustrating an operation of the fourth embodiment. When receiving a signal from the antenna (initially receiving a signal from an omnidirectional antenna), the guard interval correlator 12 calculates the correlation of a guard interval portion of the received signal, and the output measuring unit 13 measures the peak output Ppeak of the guard interval correlator 12. The comparator 14 compares the peak output Ppeak measured by the output measuring unit 13 with a preset threshold (the first predetermined value) A, and when the peak output Ppeak falls below the preset threshold (the first predetermined value) A, outputs a control signal to the array weight controller 21. When receiving the control signal from the comparator 14, the array weight controller 21 outputs a control signal to the array weighted synthesizer 20 and changes the directivity of antenna by controlling the weighting factor used for weighting the signal received by the antenna. The array weight controller 21 controls the weighting factor to make a half-value angle of the directivity of antenna relatively narrow.

Figure 17:
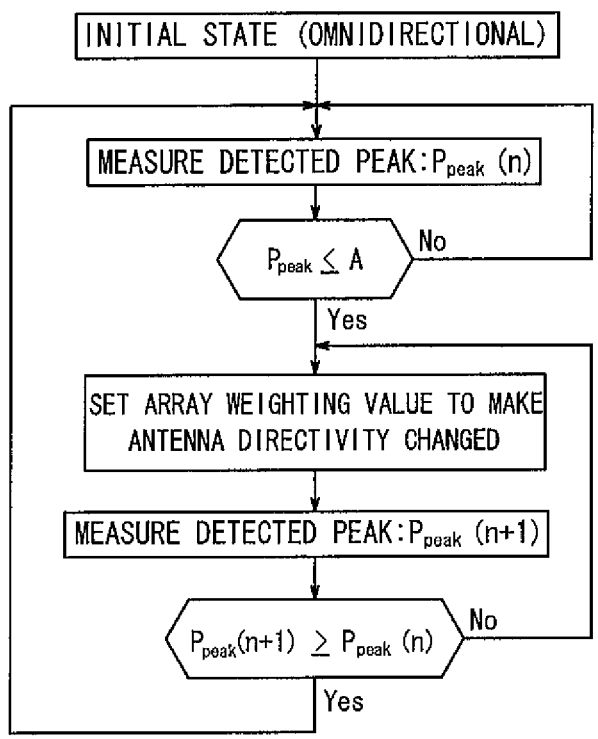
FIG. 17 is a flowchart illustrating an operation for controlling a weighting factor to make a peak output exceed a predetermined value.

In addition, it should be noted that the array weight controller 21 may control the weighting factor to make the peak output exceed a predetermined value after changing the directivity of antenna using the method shown in FIG. 16. FIG. 17 is a flowchart illustrating an operation for controlling the weighting factor to make the peak output exceed the predetermined value after changing the directivity of antenna. When receiving a signal from the antenna (initially receiving a signal from an omnidirectional antenna), the guard interval correlator 12 calculates the correlation of a guard interval portion of the received signal and the output measuring unit 13 measures the peak output Ppeak(n) of the guard interval correlator 12. The comparator 14 compares the peak output Ppeak(n) measured by the output measuring unit 13 with a preset threshold (the first predetermined value) A, and when the Ppeak(n) falls below the preset threshold (the first predetermined value) A, outputs a control signal to the array weight controller 21. When receiving the control signal from the comparator 14, the array weight controller 21 outputs a control signal to the array weighted synthesizer 20 and changes the directivity of antenna by controlling the weighting factor used for weighting a signal received by the antenna. After changing the directivity of antenna, the guard interval correlator 12 calculates the correlation of a guard interval portion of a received signal, and the output measuring unit 13 measures the peak output Ppeak(n+1) of the guard interval correlator 12. The comparator 14 compares the peak output Ppeak(n+1) measured by the output measuring unit 13 with the peak output Ppeak(n) (predetermined value) and outputs a control signal to the array weight controller 21 when the peak output Ppeak(n+1) falls below the peak output Ppeak(n). When receiving the control signal from the comparator 14, the array weight controller 21 outputs a control signal to the array weighted synthesizer 20 and changes the directivity of antenna by controlling the weighting factor to make the peak output Ppeak(n+1) exceed the peak output Ppeak(n) (predetermined value).

It should be noted that the array weight controller 21 may control the weighting factor until the peak output Ppeak(n+1) exceeds the preset threshold (predetermined value) Ppeak(n).

In addition, it should be noted that the antenna and the antenna control unit in accordance with the fourth embodiment may include the output measuring unit 13A and the comparator 14A shown in FIG. 4 instead of the output measuring unit 13 and the comparator 14 as in the case of the first embodiment, or may include the output measuring unit 13B and the comparator 14B shown in FIG. 8 instead of the output measuring unit 13 and the comparator 14.

Figure 18:
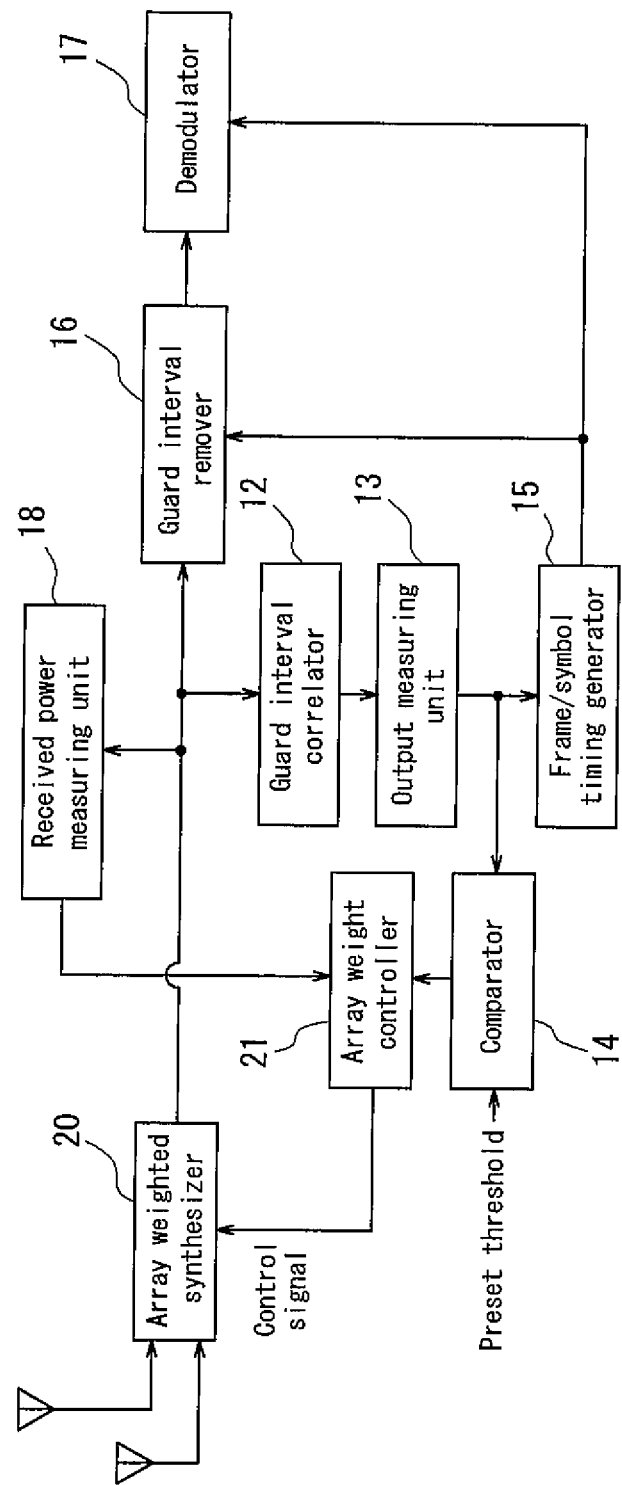
FIG. 18 is a functional block diagram showing a wireless communication apparatus in accordance with a fifth embodiment of the present invention.

FIG. 18 is a functional block diagram showing an antenna and an antenna control unit in accordance with a fifth embodiment. The antenna and the antenna control unit shown in FIG. 18 include a plurality of directional antennas (adaptive array antennas), an array weighted synthesizer 20, a received power measuring unit 18 for measuring an output signal of the array weighted synthesizer 20, a guard interval correlator 12, an output measuring unit 13, a comparator 14 and an array weight controller 21.

Figure 19:
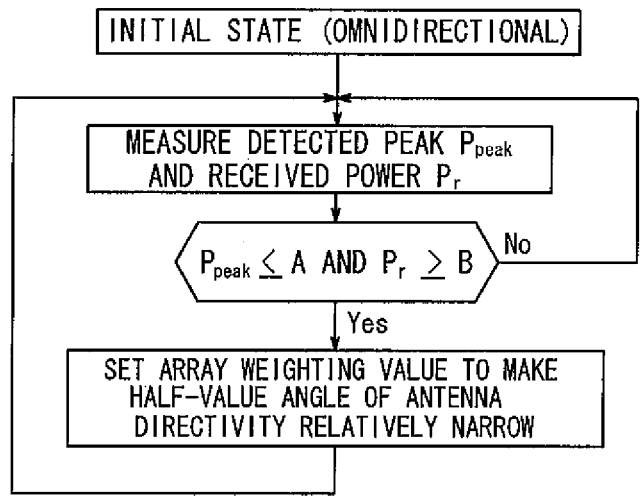
FIG. 19 is a flowchart illustrating an operation of the fifth embodiment.

FIG. 19 is a flowchart illustrating an operation of the fifth embodiment. When receiving a signal from the antenna (initially receiving a signal from an omnidirectional antenna), the guard interval correlator 12 calculates the correlation of a guard interval portion of the received signal, and the output measuring unit 13 measures the peak output Ppeak of the guard interval correlator 12. The comparator 14 compares the peak output Ppeak measured by the output measuring unit 13 with a preset threshold (the first predetermined value) A and outputs a control signal to the array weight controller 21 when the peak output Ppeak falls below the preset threshold (the first predetermined value) A. The received power measuring unit 18 outputs a control signal to the array weight controller 21 when the received power Pr exceeds a preset threshold (the third predetermined value) B. When receiving the control signals from the comparator 14 and the received power measuring unit 18, respectively, the array weight controller 21 outputs a control signal to the array weighted synthesizer 20 and changes the directivity of antenna by controlling the weighting factor used for weighting the signal received by the antenna. The array weight controller 21 controls the weighting factor to make a half-value angle of the directivity of antenna relatively narrow.

Figure 20:
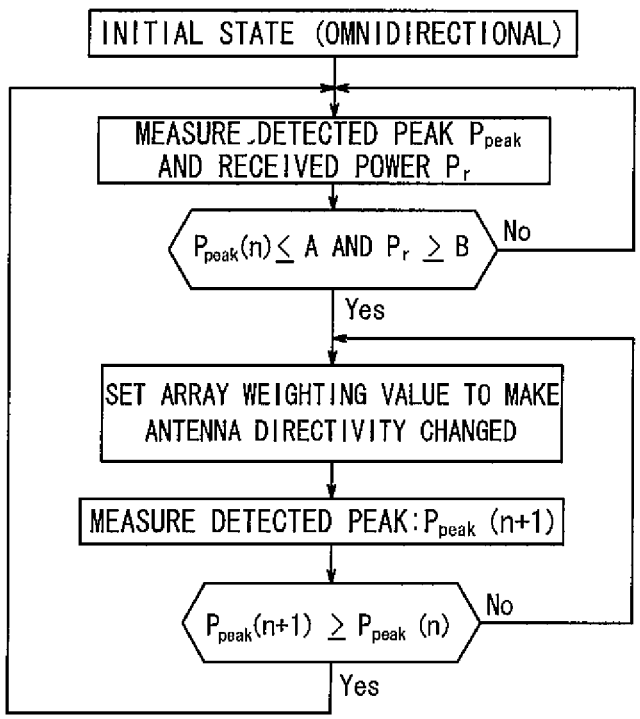
FIG. 20 is a flowchart illustrating an operation for controlling a weighting factor to make a peak output exceed a predetermined value.

In addition, it should be noted that the array weight controller 21 may control the weighting factor to make the peak output exceed a predetermined value after changing the directivity of antenna using the method shown in FIG. 19. FIG. 20 is a flowchart illustrating an operation for controlling the weighting factor to make the peak output exceed the predetermined value after changing the directivity of antenna. When receiving a signal from the antenna (initially receiving a signal from an omnidirectional antenna), the guard interval correlator 12 calculates the correlation of a guard interval portion of the received signal, and the output measuring unit 13 measures the peak output Ppeak(n) of the guard interval correlator 12. The comparator 14 compares the peak output Ppeak(n) measured by the output measuring unit 13 with a preset threshold (the first predetermined value) A and when the Ppeak (n) falls below the preset threshold (the first predetermined value) A, outputs a control signal to the array weight controller 21. The received power measuring unit 18 outputs a control signal to the array weight controller 21 when the received power Pr exceeds a preset threshold (the third predetermined value) B. When receiving the control signals from the comparator 14 and the received power measuring unit 18, respectively, the array weight controller 21 outputs a control signal to the array weighted synthesizer 20 and changes the directivity of antenna by controlling the weighting factor used for weighting the signal received by the antenna. After changing the directivity of antenna, the guard interval correlator 12 calculates the correlation of a guard interval portion of a received signal, and the output measuring unit 13 measures the peak output Ppeak(n+1) of the guard interval correlator 12. The comparator 14 compares the peak output Ppeak(n+1) measured by the output measuring unit 13 with the peak output Ppeak(n) (predetermined value) and outputs a control signal to the array weight controller 21 when the peak output Ppeak(n+1) falls below the peak output Ppeak(n). When receiving the control signal from the comparator 14, the array weight controller 21 outputs a control signal to the array weighted synthesizer 20 and changes the directivity of antenna by controlling the weighting factor to make the peak output Ppeak(n+1) exceed the peak output Ppeak(n) (predetermined value).

It should be noted that the array weight controller 21 may control the weighting factor until the peak output Ppeak(n+1) exceeds the preset threshold (predetermined value) Ppeak(n).

In addition, it should be noted that the antenna and the antenna control unit in accordance with the fifth embodiment may include the output measuring unit 13A and the comparator 14A shown in FIG. 4 instead of the output measuring unit 13 and the comparator 14 as in the case of the first embodiment, or may include the output measuring unit 13B and the comparator 14B instead of the output measuring unit 13 and the comparator 14.

Figure 21:
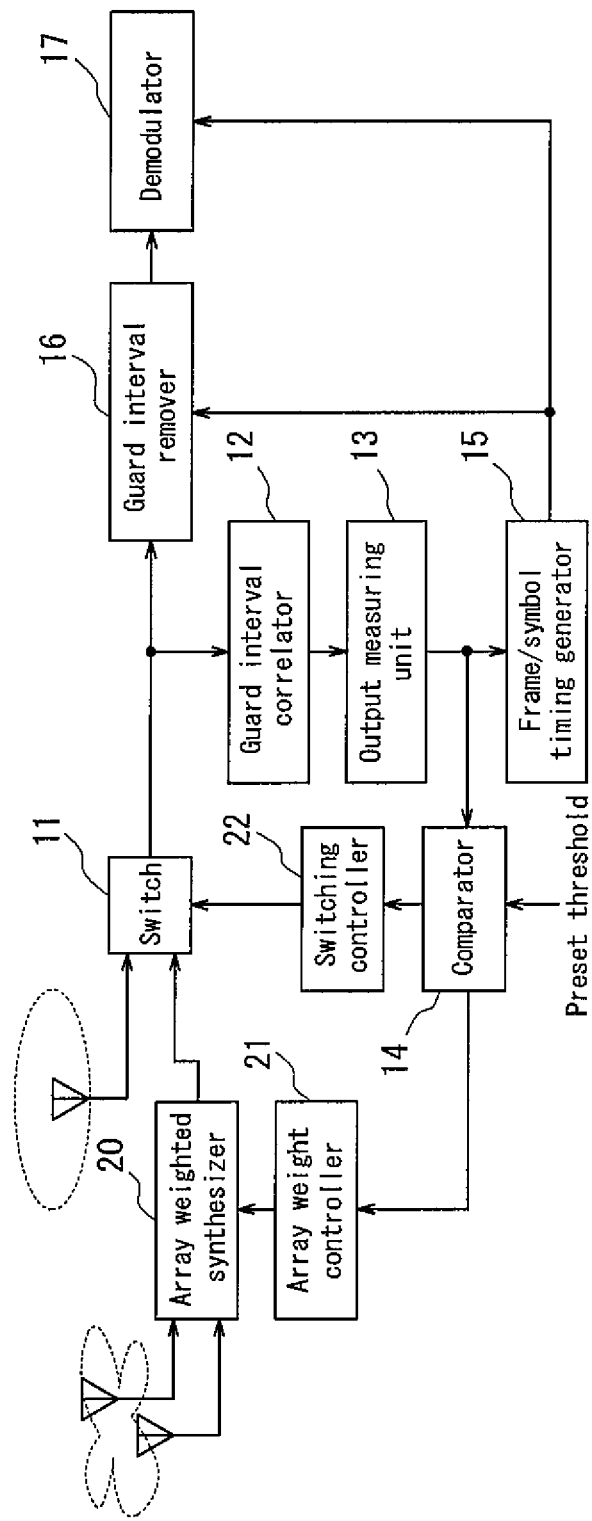
FIG. 21 is a functional block diagram showing a wireless communication apparatus in accordance with a sixth embodiment of the present invention.

FIG. 21 is a functional block diagram showing an antenna and an antenna control unit in accordance with a sixth embodiment. The antenna and the antenna control unit shown in FIG. 21 include a plurality of antennas having different directivities including a directional antenna (adaptive array antenna), an array weighted synthesizer 20, an antenna switch 11, a guard interval correlator 12, an output measuring unit 13, a comparator 14, an array weight controller 21 and a switching controller 22.

Figure 22:
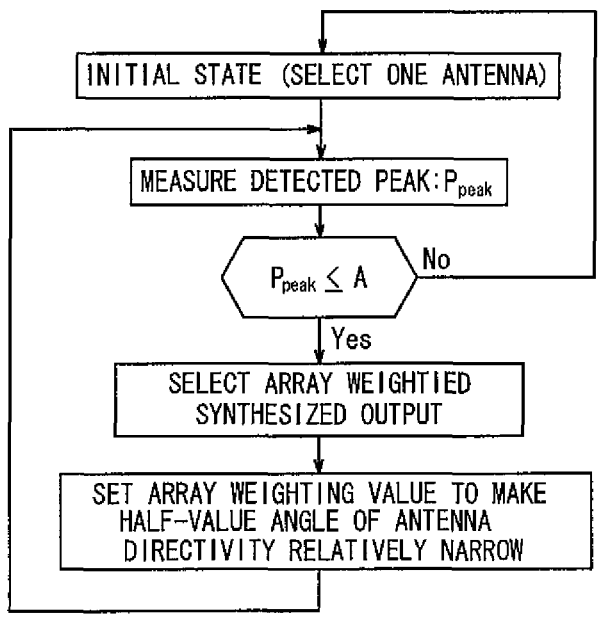
FIG. 22 is a flowchart illustrating an operation of the sixth embodiment.

FIG. 22 is a flowchart illustrating an operation of the sixth embodiment. When receiving a signal from the antenna (initially one antenna is selected), the guard interval correlator 12 calculates the correlation of a guard interval portion of the received signal, and the output measuring unit 13 measures the peak output Ppeak of the guard interval correlator 12. The comparator 14 compares the peak output Ppeak measured by the output measuring unit 13 with the preset threshold (the first predetermined value) A and outputs a control signal to the switching controller 22 when the peak output Ppeak falls below the preset threshold (the first predetermined value) A. When receiving the control signal from the comparator 14, the switching controller 22 controls the antenna switch 11 to switch to output of the array weighted synthesizer 20. After switching, the guard interval correlator 12 calculates the correlation of a guard interval portion with respect to the output signal of the array weighted synthesizer 20, and the output measuring unit 13 measures the peak output Ppeak of the guard interval correlator 12. The comparator 14 outputs a control signal to the array weight controller 21 when the peak output Ppeak measured by the output measuring unit 13 falls below the preset threshold (the first predetermined value) A. When receiving the control signal from the comparator 14, the array weight controller 21 outputs a control signal to the array weighted synthesizer 20 and changes the directivity of antenna by controlling the weighting factor used for the weighting the signal received by the antenna. The array weight controller 21 controls the weighting factor to make the half-value angle of the directivity of antenna relatively narrow.

Figure 23:
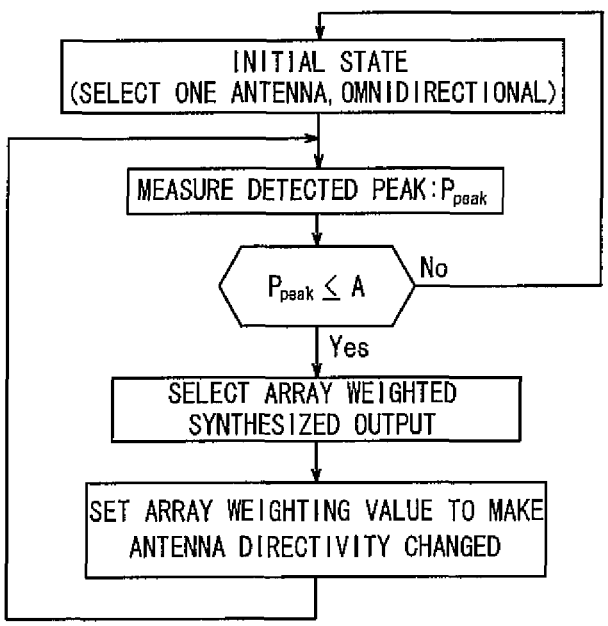
FIG. 23 is a flowchart illustrating an operation for controlling a weighting factor to make a peak output exceed a preset threshold.

In addition, when the peak output Ppeak measured by the output measuring unit 13 falls below the preset threshold (the first predetermined value) A after switching to the output of the array weighted synthesizer 20, the array weight controller 21 may control the weighting factor to make the peak output Ppeak exceed the preset threshold (the first predetermined value) A. FIG. 23 is a flowchart illustrating an operation for controlling the weighting factor to make the peak output exceed the preset threshold after switching to the output of the array weighted synthesizer 20. Further, the array weight controller 21 may control the weighting factor until the peak output Ppeak measured by the output measuring unit 13 exceeds the preset threshold (the first predetermined value) A.

In addition, it should be noted that the antenna and the antenna control unit in accordance with the sixth embodiment may include the output measuring unit 13A and the comparator 14A shown in FIG. 4 instead of the output measuring unit 13 and the comparator 14 as in the case of the first embodiment, or may include the output measuring unit 13B and the comparator 14B shown in FIG. 8 instead of the output measuring unit 13 and the comparator 14.

Figure 24:
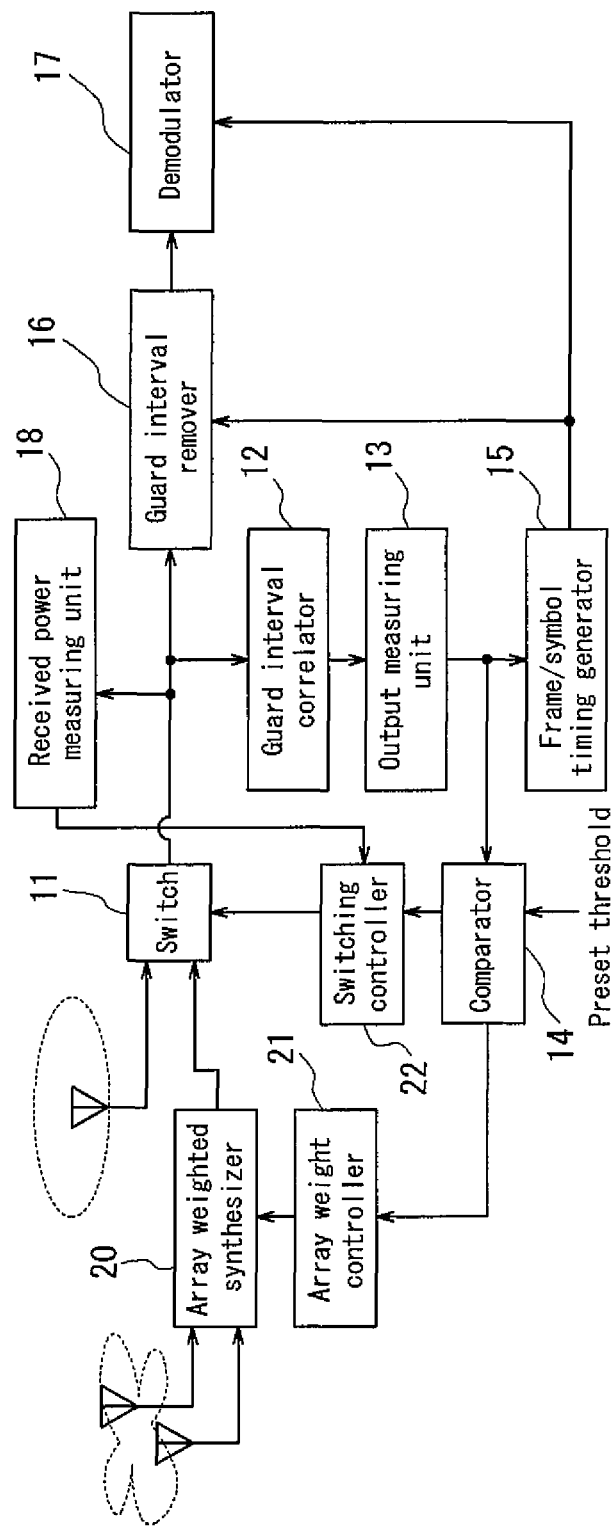
FIG. 24 is a functional block diagram showing a wireless communication apparatus in accordance with a seventh embodiment of the present invention.

FIG. 24 is a functional block diagram showing an antenna and an antenna control unit in accordance with a seventh embodiment. The antenna and the antenna control unit shown in FIG. 24 include a plurality of antennas having different directivities including a directional antenna (adaptive array antennas), an array weighted synthesizer 20, an antenna switch 11, a received power measuring unit 18 for measuring the power of output signal of the antenna switch 11, a guard interval correlator 12, an output measuring unit 13, a comparator 14, an array weight controller 21 and a switching controller 22.

Figure 25:
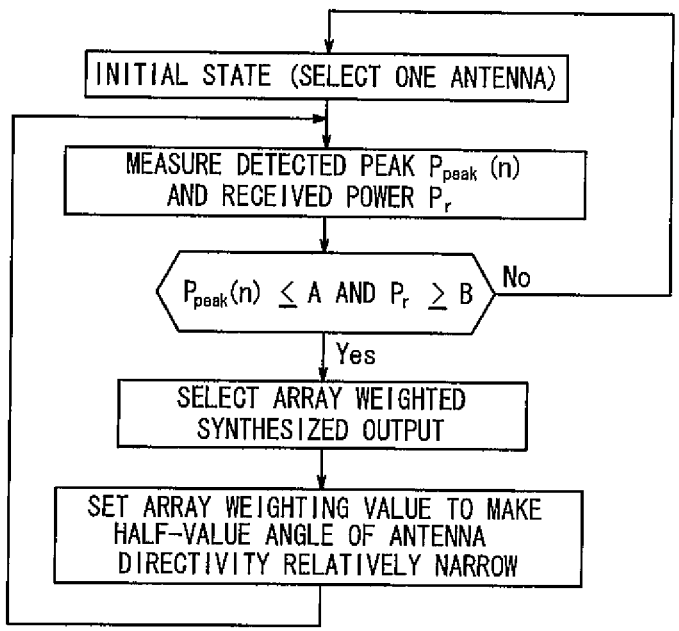
FIG. 25 is a flowchart illustrating an operation of the seventh embodiment.

FIG. 25 is a flowchart illustrating an operation of the seventh embodiment. When receiving a signal from the antenna (initially one antenna is selected), the guard interval correlator 12 calculates the correlation of a guard interval portion of received signal, and the output measuring unit 13 measures the peak output Ppeak(n) of the guard interval correlator 12. The comparator 14 compares the peak output Ppeak(n) measured by the output measuring unit 13 with the preset threshold (the first predetermined value) A and outputs a control signal to the switching controller 22 when the peak output Ppeak(n) falls below the preset threshold (the first predetermined value) A. The received power measuring unit 18 outputs a control signal to the switching controller 22 when the received power Pr exceeds the preset threshold (the third predetermined value) B. When receiving the control signals from the comparator 14 and the received power measuring unit 18, respectively, the switching controller 22 controls the antenna switch 11 to switch to the output of the array weighted synthesizer 20. After switching, the guard interval correlator 12 calculates the correlation of a guard interval portion with respect to the output signal of the array weighted synthesizer 20 and the output measuring unit 13 measures the peak output Ppeak(n) of the guard interval correlator 12. The comparator 14 outputs a control signal to the array weight controller 21 when the peak output Ppeak(n) measured by the output measuring unit 13 falls below the preset threshold (the first predetermined value) A. When receiving the control signal from the comparator 14, the array weight controller 21 outputs a control signal to the array weighted synthesizer 20 and changes the directivity of antenna by controlling the weighing factor used for weighting the signal received by the antenna. The array weight controller 21 controls the weighting factor to make the half-value angle of the directivity of antenna relatively narrow.

Figure 26:
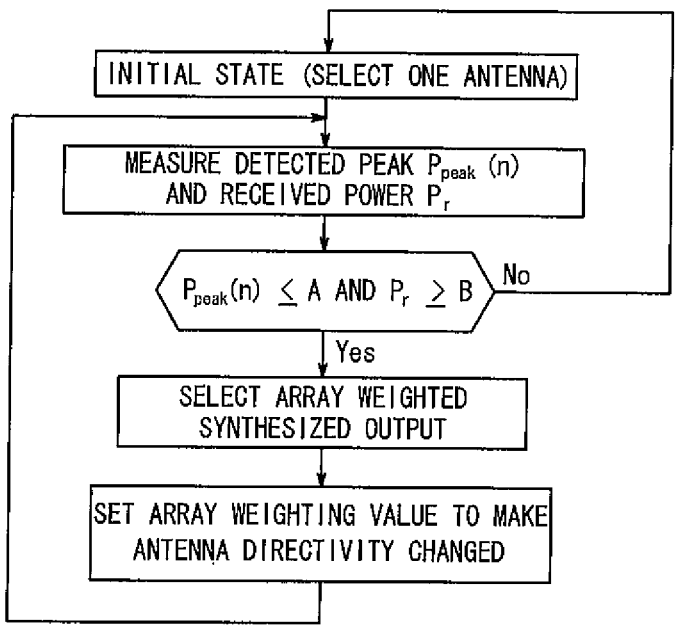
FIG. 26 is a flowchart illustrating an operation for controlling a weighting factor to make a peak output exceed a preset threshold.

Moreover, when the peak output Ppeak(n) measured by the output measuring unit 13 falls below the preset threshold (the first predetermined value) A after switching to the output of the array weighted synthesizer 20, the array weight controller 21 may control the weighing factor to make the peak output Ppeak(n) exceed the preset threshold (the first predetermined value) A. FIG. 26 is a flowchart illustrating an operation for controlling the weighing factor to make the peak output exceed the preset threshold after switching to the output of the array weighted synthesizer 20. In addition, the array weight controller 21 may control the weighting factor until the peak output Ppeak(n) measured by the output measuring unit 13 exceeds the preset threshold (the first predetermined value) A.

Further, it should be noted that the antenna and the antenna control unit in accordance with the seventh embodiment may include the output measuring unit 13A and the comparator 14A shown in FIG. 4 instead of the output measuring unit 13 and the comparator 14 as in the case of the first embodiment, or may include the output measuring unit 1313 and the comparator 14B shown in FIG. 8 instead of the output measuring unit 13 and the comparator 14.

Figure 27:
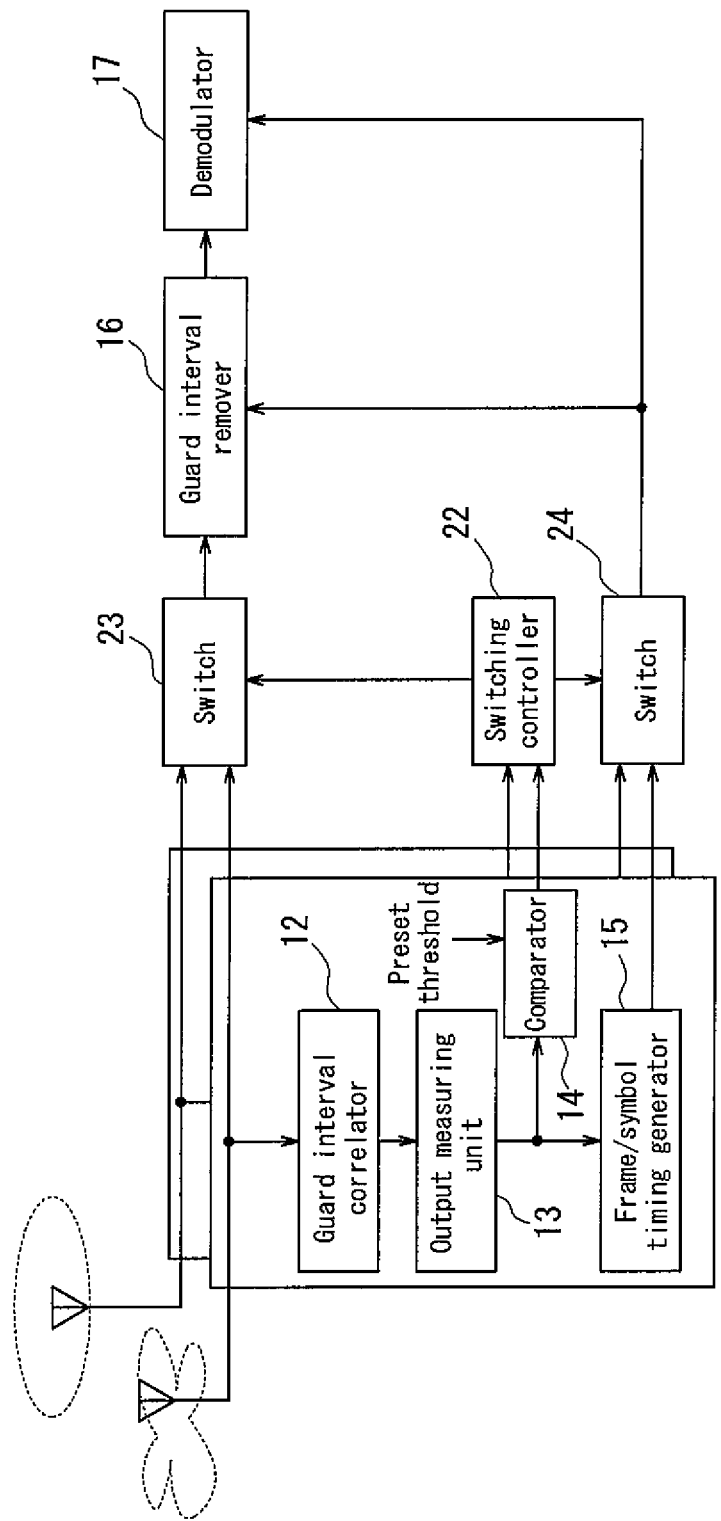
FIG. 27 is a functional block diagram showing a wireless communication apparatus in accordance with an eighth embodiment of the present invention.

FIG. 27 is a functional block diagram showing an antenna and an antenna control unit in accordance with an eighth embodiment. The antenna and the antenna control unit shown in FIG. 27 include a plurality of antennas having different directivities, a received signal switch 23 for switching received signals from the plurality of antennas, guard interval correlators 12 for calculating correlations of guard interval portions of received signals, respectively, output measuring units 13, comparators 14, frame/symbol timing generators 15 for generating symbol timing signals and frame timing signals based on the peak outputs measured by the output measuring units 13, respectively, a timing signal switch 24 for switching frame/symbol timing signals and a switching controller 22. It should be noted that the received signal switched by the received signal switch 23 may be a signal received by a single antenna or a received signal after antenna array weighted synthesizing process.

Figure 28:
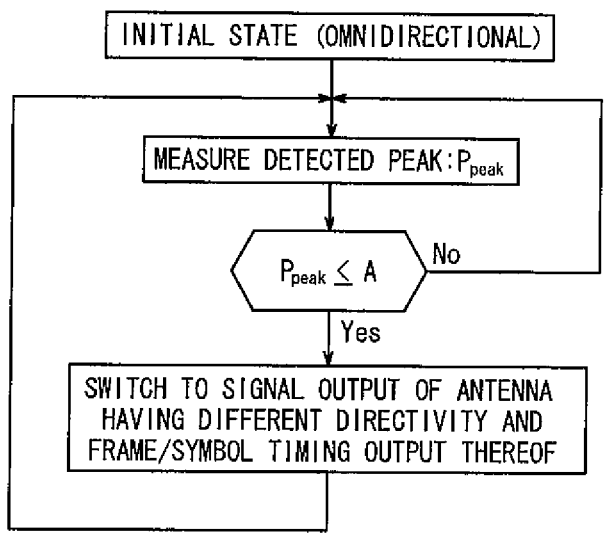
FIG. 28 is a flowchart illustrating an operation of the eighth embodiment.

FIG. 28 is a flowchart illustrating an operation of the eighth embodiment. When receiving a signal from the antenna (initially receiving a signal from an omnidirectional antenna), the guard interval correlator 12 calculates the correlation of a guard interval portion of the received signal, and the output measuring unit 13 measures the peak output Ppeak of the guard interval correlator 12. The comparator 14 compares the peak output Ppeak measured by the output measuring unit 13 with a preset threshold (the first predetermined value) A and when the Ppeak falls below the preset threshold (the first predetermined value) A, outputs a switching control signal to the switching controller 22. When receiving the switching control signal from the comparator 14, the switching controller 22 outputs a switching signal to the received signal switch 23 and the timing signal switch 24 and changes the directivity of the antenna in the plurality of antennas by simultaneously switching to a signal through an antenna having a different directivity and a frame/symbol timing signal thereof.

Figure 29:
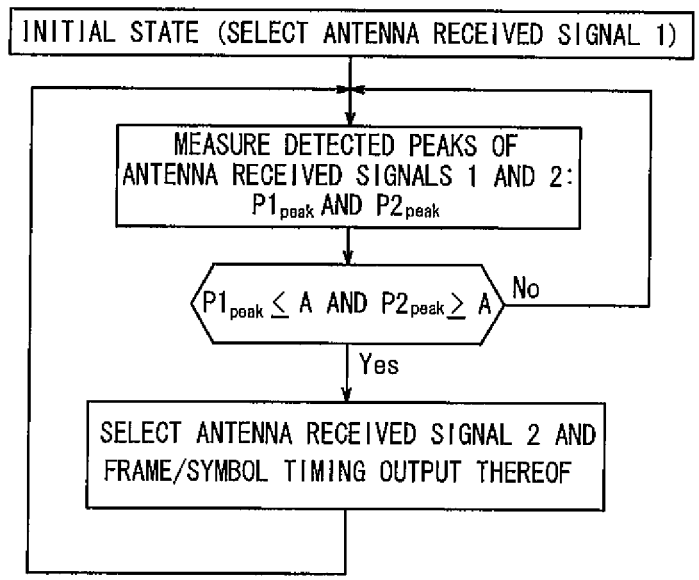
FIG. 29 is a flowchart illustrating an operation in a case where it is previously known that a detected peak output of a received signal at an antenna to be switched to is less than the preset threshold.

The switching operations do not performed when the switching controller 22 previously recognizes that a detected peak output Ppeak of a received signal to be connected by the switching is below the preset threshold (the first predetermined value) A. As shown in FIG. 29, the guard interval correlator 12 that has received an antenna received signal 1 (initially the antenna received signal 1 is selected) calculates the correlation of a guard interval portion of the received signal, the output measuring unit 13 measures the peak output P1peak of the antenna received signal 1 and the comparator 14 outputs the measured value to the switching controller 22. Another guard interval correlator 12 that has received an antenna received signal 2 calculates the correlation of a guard interval portion of the received signal, the output measuring unit 13 measures the peak output P2peak of the antenna received signal 2, and the comparator 14 outputs the measured value to the switching controller 22. When the peak output P1peak of the antenna received signal 1 falls below a preset threshold (the first predetermined value) A and the peak output P2peak of the antenna received signal 2 exceeds the preset threshold (the first predetermined value) A, the switching controller 22 outputs a switching signal to the received signal switch 23 and the timing signal switch 24 to simultaneously switch to the antenna received signal 2 and the frame/symbol timing signal thereof.

Figure 30:
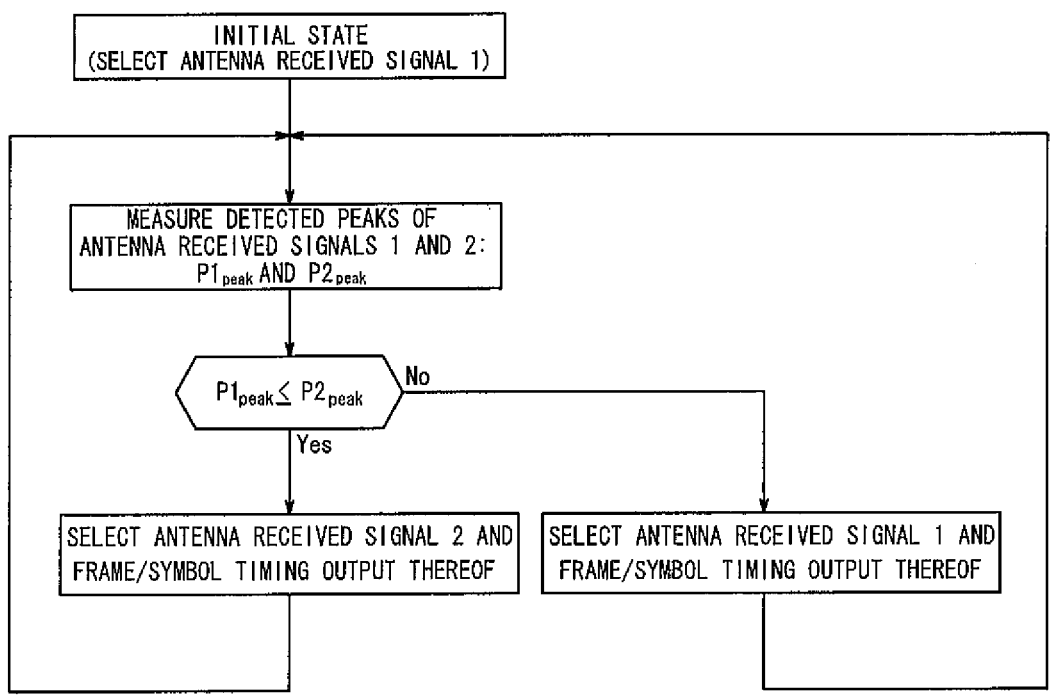
FIG. 30 is a flowchart illustrating an operation for switching to a received signal and a frame/symbol timing signal of an antenna having a higher detected peak output.

The switching controller 22 may switch to a received signal having a higher detected peak output Ppeak and the frame/symbol timing signal thereof. As shown in FIG. 30, the guard interval correlator 12 that has received the antenna received signal 1 (initially the antenna received signal 1 is selected) calculates the correlation of a guard interval portion of the received signal, the output measuring unit 13 measures the peak output P1peak of the antenna received signal 1 and the comparator 14 outputs the measured value to the switching controller 22. Another guard interval correlator 12 that has received the antenna received signal 2 calculates the correlation of a guard interval portion of the received signal. The output measuring unit 13 measures the peak output P2peak of the antenna received signal 2 and the comparator 14 outputs the measured value to the switching controller 22. When the peak output P1peak is smaller than the peak output P2peak, the switching controller 22 outputs a switching signal to the received signal switch 23 and the timing signal switch 24 to simultaneously switch to the antenna received signal 2 and the frame/symbol timing signal thereof. When the peak output P1peak is greater than the peak output P2peak, the switching controller 22 outputs a switching signal to the received signal switch 23 and the timing signal switch 24 to simultaneously switch to the antenna received signal 1 and the frame/symbol timing signal thereof.

In addition, it should be noted that the antenna and the antenna control unit in accordance with the eighth embodiment may include the output measuring unit 13A and the comparator 14A shown in FIG. 4 instead of the output measuring unit 13 and the comparator 14 as in the case of the first embodiment, or may include the output measuring unit 13B and the comparator 14B shown in FIG. 8 instead of the output measuring unit 13 and the comparator 14.

Figure 31:
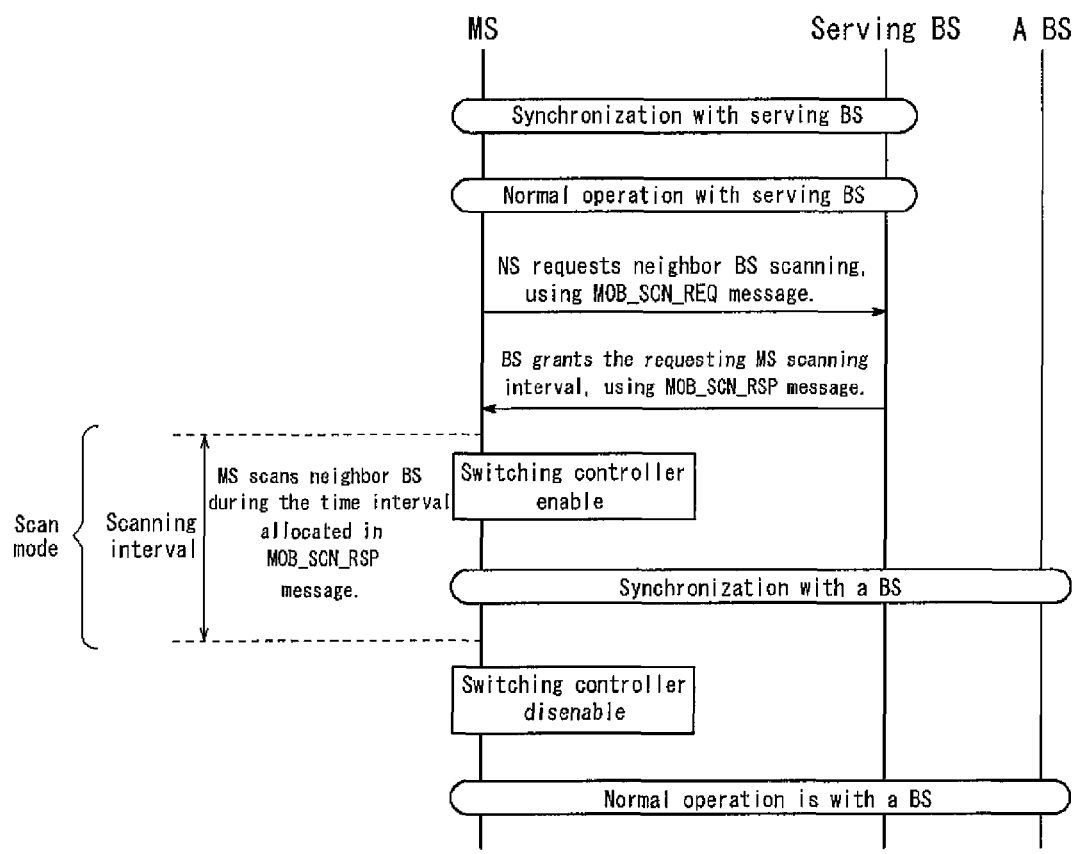
FIG. 31 is a sequence diagram illustrating an operation for performing handover from a base station on a current corresponding party side to a base station on another corresponding party side.

In addition, the above-described wireless communication apparatus executes any one of the first to eighth embodiments described above when performing initial connection from a base station (wireless communication apparatus) on a corresponding party side and/or connecting from a base station (wireless communication apparatus) on a current corresponding party side to a base station (wireless communication apparatus) on another corresponding party side and stops execution of the one of the first to eighth embodiments when completing the initial connection to the base station on the corresponding party side and/or the changes of connection from the base station on the current corresponding party side to the base station on another corresponding party side. FIG. 31 is a sequence diagram illustrating an operation when the wireless communication apparatus changes connection from the base station (wireless communication apparatus) on the current corresponding party side to the base station (wireless communication apparatus) on another corresponding party side (when performing handover).

Further, when initially connecting to the base station (wireless communication apparatus) on the corresponding party side, and/or connecting from the base station (wireless communication apparatus) on the current corresponding party side to the base station (wireless communication apparatus) on another corresponding party side, the wireless communication apparatus recognizes if synchronization is established with the base station on the corresponding party side which is a connection target in the predetermined period, and as a result of the recognition, if it is recognized that the synchronization is not established with the base station on the corresponding party side which is the connection target in the predetermined period, the wireless communication apparatus executes any one of the first to eighth embodiments and if it is recognized that the synchronization is established with the base station on the corresponding party side which is the connection target in the predetermined period, stops executing the one of the first to eighth embodiments.

Moreover, the wireless communication apparatus measures the clock jitter amount of the symbol timing of the frame of a received signal and if the measured clock jitter amount exceeds a predetermined value, executes any one of the first to eighth embodiments and if the measured clock jitter amount falls below the predetermined value when measuring the clock jitter amount after executing the embodiment, stops executing the one of the first to eighth embodiments.

When stopping execution of the one of the first to eighth embodiments, the wireless communication apparatus controls the directivity of the antenna in a plurality of antennas to be omnidirectional.

In addition, the directivity of the antenna in a plurality of antennas is omnidirectional when the wireless communication apparatus starts initial connection to the base station (wireless communication apparatus) on the corresponding party side and/or starts connection from the base station (wireless communication apparatus) on the current communication party side to the base station (wireless communication apparatus) on another corresponding party side, and alter executing any one of the first to eighth embodiments, the directivity of the antenna in a plurality of antennas is directional.

As described above, according to the present invention, it is possible to appropriately process a received signal even when a wireless communication apparatus moving at a high speed performs initial connection or handover in the environment where coverages of neighboring cells overlap such as cell edges. That is, even when the peak of guard interval correlation output drops and generation of a frame/symbol timing clock and synchronization of frequency cannot be performed, a plurality of antenna switching diversity and array synthesis diversity enable reception of a signal whose Doppler shift is reduced, raise in the guard interval correlation peak and regeneration of a frame/symbol timing clock.

The invention claimed is:

1. A reception control method for a wireless communication apparatus having a plurality of antennas, comprising:
a recognition step of recognizing a peak output of a guard interval correlator and/or recognizing a number of samples exceeding a predetermined power value in a predetermined period from output of the guard interval correlator with respect to a received signal; and
an antenna directivity control step of changing directivity of an antenna in the plurality of antennas when the recognized peak output falls below a first predetermined value and/or the number of samples exceeds a second predetermined value, wherein,
the plurality of antennas include a first antenna and a second antenna that have directivities different from each other,
at the antenna directivity control step, the directivity of the antenna in the plurality of antennas is changed by switching from the first antenna to the second antenna when the peak output falls below the first predetermined value and/or the number of samples exceeds the second predetermined value,
at the recognition step, the peak output of the guard interval correlator is recognized and/or the number of samples exceeding the predetermined power value in the predetermined period is recognized from the output of the guard interval correlator with respect to a received signal of at least the first antenna, and
at the antenna directivity control step, the directivity of the antenna in the plurality of antennas is changed and a symbol timing of a frame of the received signal of the first antenna is changed to a symbol timing of a frame of a received signal of the second antenna by switching from the first antenna to the second antenna when the peak output falls below the first predetermined value and/or the number of samples exceeds the second predetermined value.

2. A reception control method for a wireless communication apparatus having a plurality of antennas, comprising:
a recognition step of recognizing a peak output of a guard interval correlator and/or recognizing a number of samples exceeding a predetermined power value in a predetermined period from output of the guard interval correlator with respect to a received signal; and
an antenna directivity control step of changing directivity of an antenna in the plurality of antennas when the recognized peak output falls below a first predetermined value and/or the number of samples exceeds a second predetermined value, wherein,
the plurality of antennas include a first antenna and a second antenna that have directivities different from each other,
at the antenna directivity control step, the directivity of the antenna in the plurality of antennas is changed by switching from the first antenna to the second antenna when the peak output falls below the first predetermined value and/or the number of samples exceeds the second predetermined value,
at the recognition step, peak outputs of the guard interval correlator are recognized and/or numbers of samples exceeding the predetermined power value in the predetermined period are recognized respectively from outputs of the guard interval correlator with respect to a received signal of the first antenna and a received signal of the second antenna, respectively, and
at the antenna directivity control step, the directivity of the antenna in the plurality of antennas is controlled and a symbol timing of a frame of the received signal of the first antenna is changed to a symbol timing of a frame of the received signal of the second antenna by adapting an antenna having a higher peak output as a result of comparison between the recognized peak outputs and/or by adapting an antenna having a smaller number of samples as a result of comparison between the recognized numbers of samples.

3. The reception control method according to claim 2, wherein the directivity of the antenna in the plurality of antennas is controlled to be omnidirectional when the execution is stopped.

4. The reception control method according to claim 2, wherein,
the directivity of the base station antenna in the plurality of antennas is omnidirectional when the wireless communication apparatus starts initial connection to a wireless communication apparatus of a corresponding party and/or starts connection from a wireless communication apparatus of a current corresponding party to a wireless communication apparatus of another corresponding party, and
the directivity of the antenna in the plurality of antennas after executing the recognition step and the antenna directivity control step is directional.

5. A reception control method for a wireless communication apparatus having a plurality of antennas, comprising:
a recognition step of recognizing a peak output of a guard interval correlator and/or recognizing a number of samples exceeding a predetermined power value in a predetermined period from output of the guard interval correlator with respect to a received signal;
an antenna directivity control step of changing directivity of an antenna in the plurality of antennas when the recognized peak output falls below a first predetermined value and/or the number of samples exceeds a second predetermined value; and
a synchronization recognition step of recognizing whether or not synchronization is established in a predetermined period with a base station on a corresponding party side which is a connection target when the wireless communication apparatus is initially connected to a wireless communication apparatus of a corresponding party and/or is connected from a wireless communication apparatus of a current corresponding party to a wireless communication apparatus of another corresponding party, wherein
when it is recognized that synchronization is not established with the base station on the corresponding party side which is the connection target in the predetermined period as a result of the recognition at the synchronization recognition step, the wireless communication apparatus executes the recognition step and the antenna directivity control step, and when it is recognized that synchronization is established with the base station on the corresponding party side which is the connection target in the predetermined period, the wireless communication apparatus stops the execution.

6. A reception control method for a wireless communication apparatus having a plurality of antennas, comprising:
a recognition step of recognizing a peak output of a guard interval correlator and/or recognizing a number of samples exceeding a predetermined power value in a predetermined period from output of the guard interval correlator with respect to a received signal;
an antenna directivity control step of changing directivity of an antenna in the plurality of antennas when the recognized peak output falls below a first predetermined value and/or the number of samples exceeds a second predetermined value; and
a clock jitter amount detection step of measuring a dock jitter amount of a symbol timing of a frame of a received signal, wherein,
when the measured clock jitter amount exceeds a predetermined value, the recognition step and the antenna directivity control step are executed, and
after the steps are executed, when the measured clock jitter amount falls below the predetermined value as a result of the clock jitter amount detection step, the above execution is stopped.

7. A wireless communication apparatus having a plurality of antennas, comprising:
a guard interval correlator which inputs a signal received by the antenna;
an output measurement unit for measuring output of the guard interval correlator;
a comparison unit for comparing a value relating to the output measured by the output measurement unit and a predetermined value; and
an antenna directivity control unit for controlling directivity of an antenna in the plurality of antennas based on a result of the comparison by the comparison unit, wherein,
the predetermined value is a value based on a power value in a predetermined period,
the value relating to the output indicates a number of samples exceeding a predetermined power value in a predetermined period with respect to the output of the guard interval correlator,
the comparison unit compares the number of samples with the predetermined value, and
the antenna directivity control unit controls to change the directivity of the antenna when the number of samples exceeds the predetermined value.

* * * * *